(12) United States Patent
Suzuki

(10) Patent No.: US 11,132,814 B2
(45) Date of Patent: Sep. 28, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Taito Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/428,689

(22) Filed: May 31, 2019

(65) Prior Publication Data

US 2019/0371000 A1  Dec. 5, 2019

(30) Foreign Application Priority Data

Jun. 5, 2018 (JP) .............................. JP2018-107658

(51) Int. Cl.
*G06T 7/73* (2017.01)
*H04N 5/232* (2006.01)
(Continued)

(52) U.S. Cl.
CPC ........... *G06T 7/74* (2017.01); *H04N 5/23299* (2018.08); *H04N 5/247* (2013.01); *G06T 7/70* (2017.01);
(Continued)

(58) Field of Classification Search
CPC ............ G06T 7/74; G06T 2207/30208; G06T 2207/30232; G06T 2207/30244;
(Continued)

(56) References Cited

U.S. PATENT DOCUMENTS 9,313,400 B2  4/2016 Chen
2006/0026646 A1*  2/2006 Lou ...................... G11B 27/105
725/52
(Continued)

FOREIGN PATENT DOCUMENTS

CN  101145920 A  3/2008
JP  2006-242943 A  9/2006

OTHER PUBLICATIONS

Mohanty et al. "A Semi-Automatic Relative Calibration of a Fixed and PTZ Camera Pair for Master-Slave Control." 3rd European Workshop on Visual Information Processing, Jul. 4, 2011, pp. 229-234 (Year: 2011).*

(Continued)

*Primary Examiner* — Jon Chang
(74) *Attorney, Agent, or Firm* — Canon U.S.A., Inc. IP Division

(57) ABSTRACT

An information processing apparatus includes a detection unit configured to detect a feature point in an image captured by a first image capturing apparatus and to detect the feature point in an image captured by a second image capturing apparatus, a spatial information processing unit configured to specify a positional relationship of the first image capturing apparatus and the second image capturing apparatus based on the feature point detected in the image captured by the first image capturing apparatus and the feature point detected in the image captured by the second image capturing apparatus, and a determination unit configured to determine an imaging direction of the second image capturing apparatus based on the positional relationship of the first image capturing apparatus and the second image capturing apparatus specified by the spatial information processing unit and a position designated in the image captured by the first image capturing apparatus.

10 Claims, 14 Drawing Sheets

(51) Int. Cl.
*H04N 5/247* (2006.01)
*G06T 7/70* (2017.01)

(52) U.S. Cl.
CPC ............... *G06T 2207/30208* (2013.01); *G06T 2207/30232* (2013.01); *G06T 2207/30244* (2013.01)

(58) Field of Classification Search
CPC ............. G06T 2207/30196; G06T 7/70; G06T 2207/10016; H04N 5/23299; H04N 5/247; H04N 7/181; H04N 5/232061; H04N 5/23222
See application file for complete search history.

(56) References Cited

U.S. PATENT DOCUMENTS

| | | | |
|---|---|---|---|
| 2007/0070190 A1* | 3/2007 | Yin .................. | G08B 13/19628 348/36 |
| 2010/0141767 A1* | 6/2010 | Mohanty .......... | G08B 13/19643 348/159 |
| 2013/0010081 A1* | 1/2013 | Tenney .................... | G06T 7/80 348/47 |

OTHER PUBLICATIONS

Jain et al. "Using Stationary-Dynamic Camera Assemblies for Wide-area Video Surveillance and Selective Attention." IEEE Computer Society Conference on Computer Vision and Pattern Recognition, Jun. 17, 2006, 8 pages (Year: 2006).*
David Beymer, et al., Eye Gaze Tracking Using an Active Stereo Head, 2003 IEEE Computer Society Conference on Computer Vision and Pattern Recognition (CVPR'03), pp. 451-458, vol. 2, X10644705.
Richard Yi Da Xu, Novel Methods for High-Resolution Facial Image Capture Using Calibrated Ptz and Static cameras, ICME 2008, pp. 45-48, XP32965224.
Dong-Chan Cho, Long Range Eye Gaze Tracking System for a Large Screen, IEEE Transactions on Consumer Electronics, Nov. 2012, current version published Dec. 28, 2012, vol. 58, No. 4, pp. 1119-1128, XP11488723.
Ankur Jain, Using Stationary-Dynamic Camera Assemblies for Wide-area Video Surveillance and Selective Attention, IEEE Computer Society Conference on Computer Vision and Pattern Recognition (CVPR'06), vol. 1, 8 pages, XP10922865.
James Davis et al., Calibrating Pan-Tilt Cameras in Wide-area Surveillance Networks, IEEE International Conference on Computer Vision, Oct. 13-16, 2003, 6 pages, vol. 1, XP055771542.

* cited by examiner

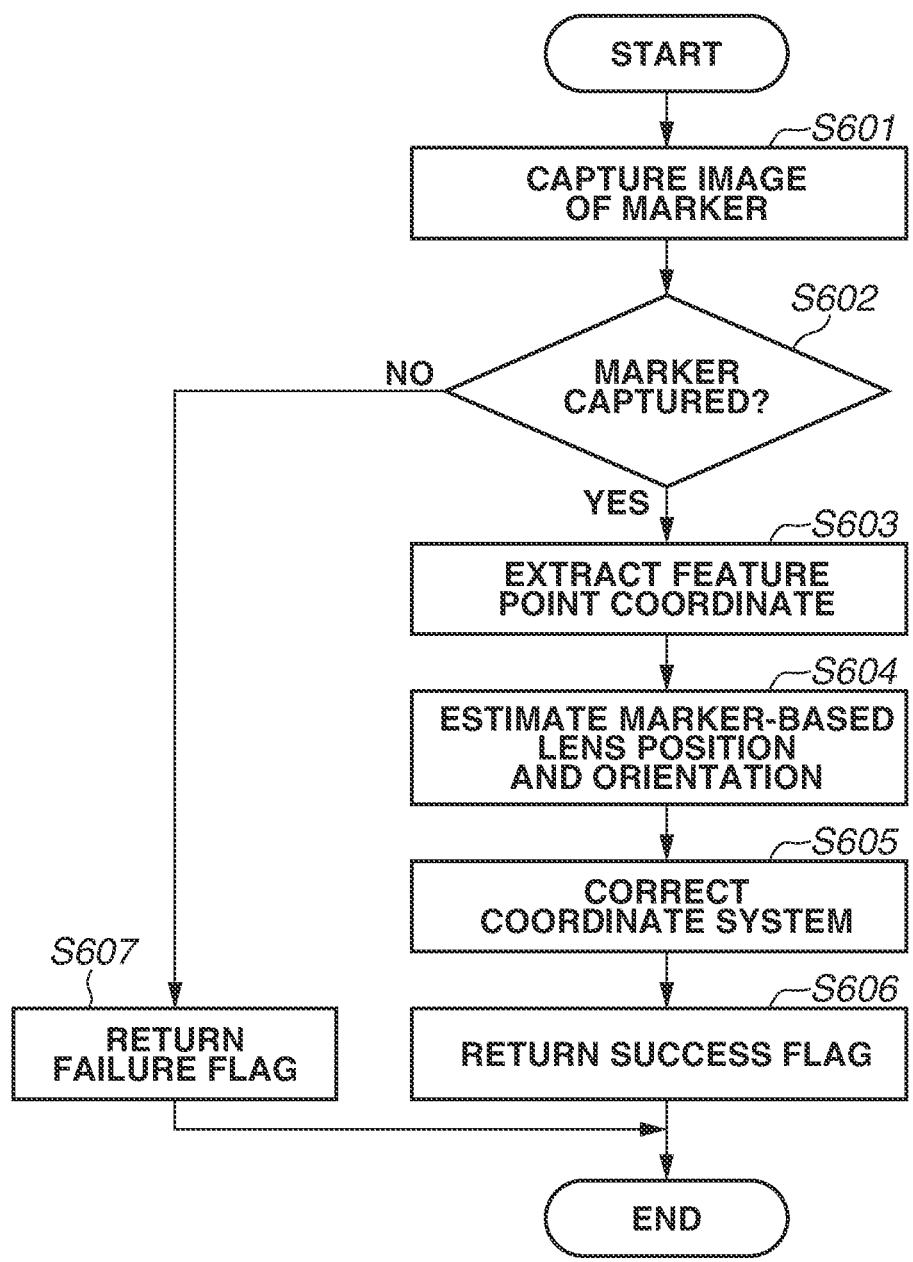

FIG.7A
FIG.7B
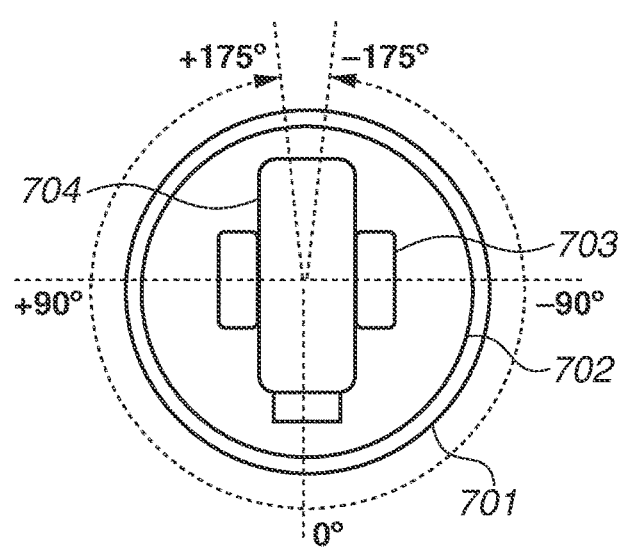
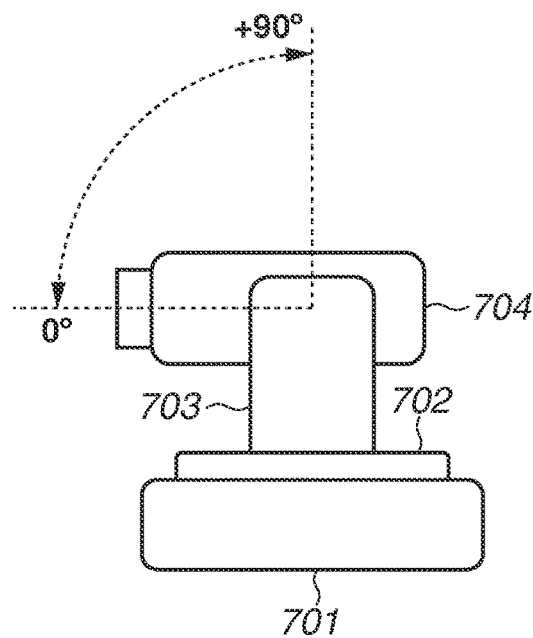

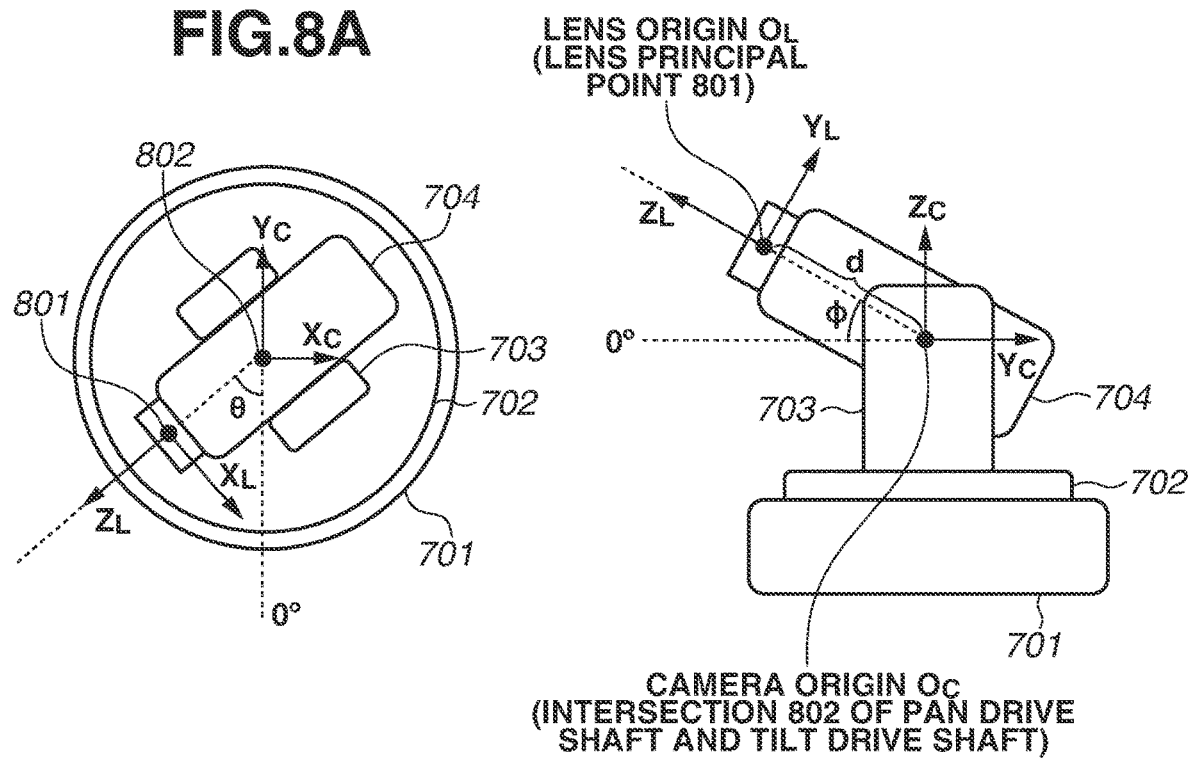

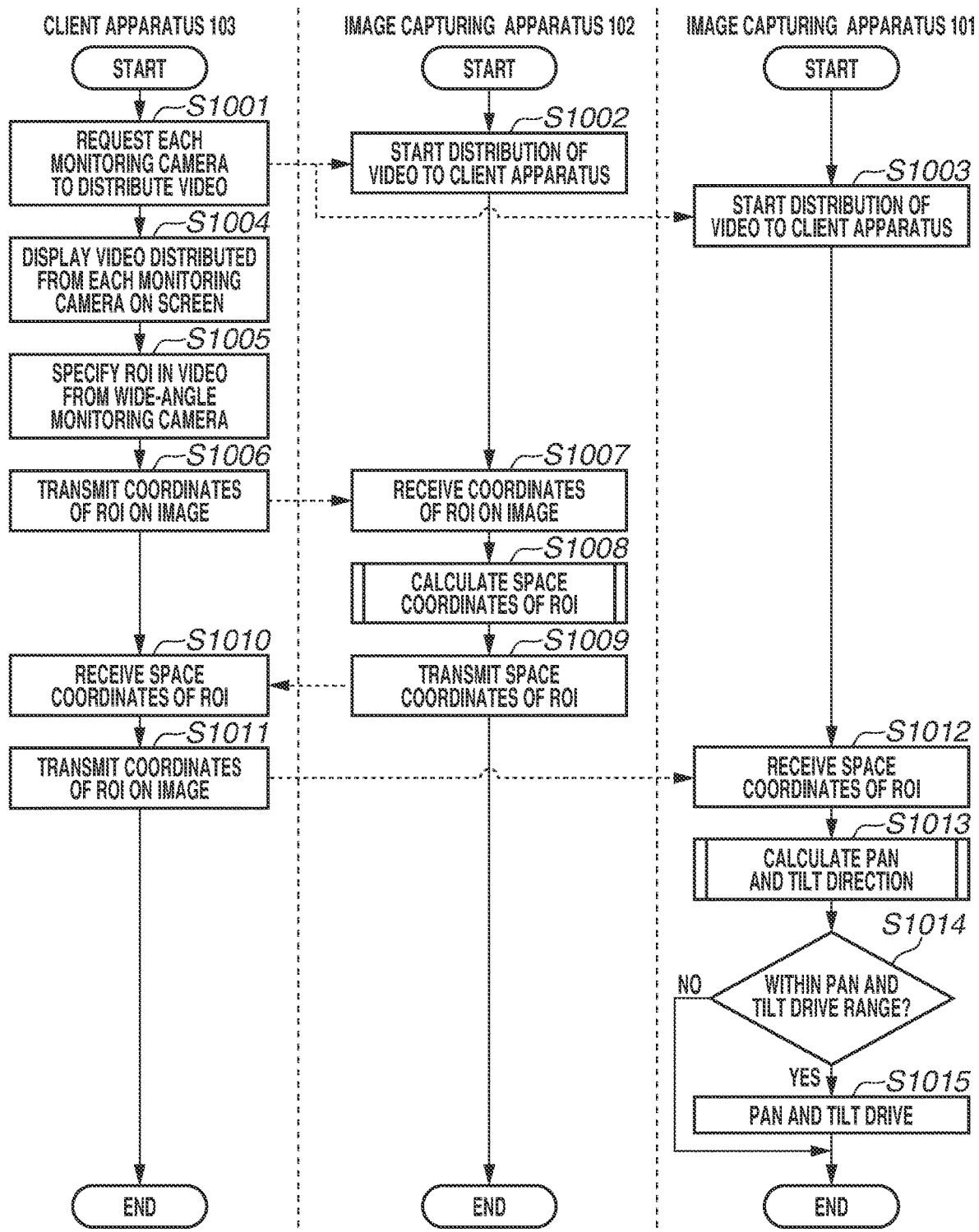

INFORMATION PROCESSING APPARATUS, INFORMATION PROCESSING METHOD, AND STORAGE MEDIUM

BACKGROUND OF THE INVENTION

Field of the Invention

The present disclosure relates to a monitoring system using a plurality of image capturing apparatuses.

Description of the Related Art

Monitoring systems using image capturing apparatuses such as network cameras have been widely used in recent years. Some image capturing apparatuses are used in a wide range of fields such as monitoring cameras in large-scale public institutions and mass retailers and include various operation methods. Some image capturing apparatuses have various functional characteristics so as to fit operation forms. Some image capturing apparatuses can freely change imaging directions such as pan and tilt directions, some can capture images using a high magnification zooming, and some are equipped with fisheye lenses and can monitor a large area at once (omnidirectional cameras).

Monitoring and the like is performed using a plurality of image capturing apparatuses in some cases. For example, an omnidirectional camera has a very wide viewing angle, whereas the number of pixels allocated to a place distant from the camera is small, so that resolution is low. Thus, the omnidirectional camera is not suitable for obtaining detailed information of a face of a person, a vehicle number, and the like. In order to compensate for this point, U.S. Pat. No. 9,313,400 describes a monitoring system which has a function of coordinating an omnidirectional camera with a camera having pan, tilt, and zoom functions (a pan-tilt-zoom (PTZ) camera). In other words, the system can monitor a wide range at once by the omnidirectional camera and obtain detailed information by enlarging and displaying an image of a point to be particularly watched out in a video by the PTZ camera. In a case where a plurality of image capturing apparatuses are coordinated with each other as described above, it is necessary to perform a calibration operation to coordinate the image capturing apparatuses with each other at the time of installation of the image capturing apparatuses.

Japanese Patent Application Laid-Open No. 2006-242943 describes a method for measuring a position and an orientation of an object by capturing an image of an object having a known pattern. A technique for estimating a camera position and orientation based on an object captured by this method is also known.

According to the conventional technique described in U.S. Pat. No. 9,313,400, a control look-up table (LUT) is established between images captured by a first image capturing apparatus and a second image capturing apparatus. Then, an imaging direction of the second image capturing apparatus is determined based on a region of interest (ROI) designated on the image captured by the first image capturing apparatus and the control LUT.

However, according to U.S. Pat. No. 9,313,400, it is necessary to perform an operation for establishing the control LUT for coordinating the image capturing apparatuses with each other in setup of the image capturing apparatuses. As a method for establishing a control LUT, for example, there is a method for manually comparing images and inputting a corresponding point. However, this method requires many man-hours on a setup operation and places a large burden on a person. In addition, in order to establish an effective control LUT by this method, it is necessary that respective angles of view of the first image capturing apparatus and of the second image capturing apparatus are largely overlapped with each other. In other words, the method described in U.S. Pat. No. 9,313,400 can be applied to only a case in which the respective angles of view of the first image capturing apparatus and the second image capturing apparatus are largely overlapped with each other, so that a situation in which the method can be executed is limited.

SUMMARY OF THE INVENTION

An information processing apparatus includes a detection unit configured to detect a feature point in an image captured by a first image capturing apparatus and to detect the feature point in an image captured by a second image capturing apparatus, a spatial information processing unit configured to specify a positional relationship between the first image capturing apparatus and the second image capturing apparatus based on the feature point detected by the detection unit from the image captured by the first image capturing apparatus and the feature point detected in the image captured by the second image capturing apparatus, and a determination unit configured to determine an imaging direction of the second image capturing apparatus based on the positional relationship between the first image capturing apparatus and the second image capturing apparatus specified by the spatial information processing unit and a position designated in the image captured by the first image capturing apparatus.

Further features of the present disclosure will become apparent from the following description of embodiments with reference to the attached drawings.

BRIEF DESCRIPTION OF THE DRAWINGS

FIG. 6 is a flowchart illustrating an example of position estimation processing.

FIGS. 7A and 7B illustrate an example of a structure of a pan-tilt-zoom (PTZ) image capturing apparatus.

FIGS. 8A and 8B illustrate an example of a coordinate system in the PTZ image capturing apparatus.

FIG. 10 is a flowchart illustrating an example of coordination processing between image capturing apparatuses.

DESCRIPTION OF THE EMBODIMENTS

Figure 1:
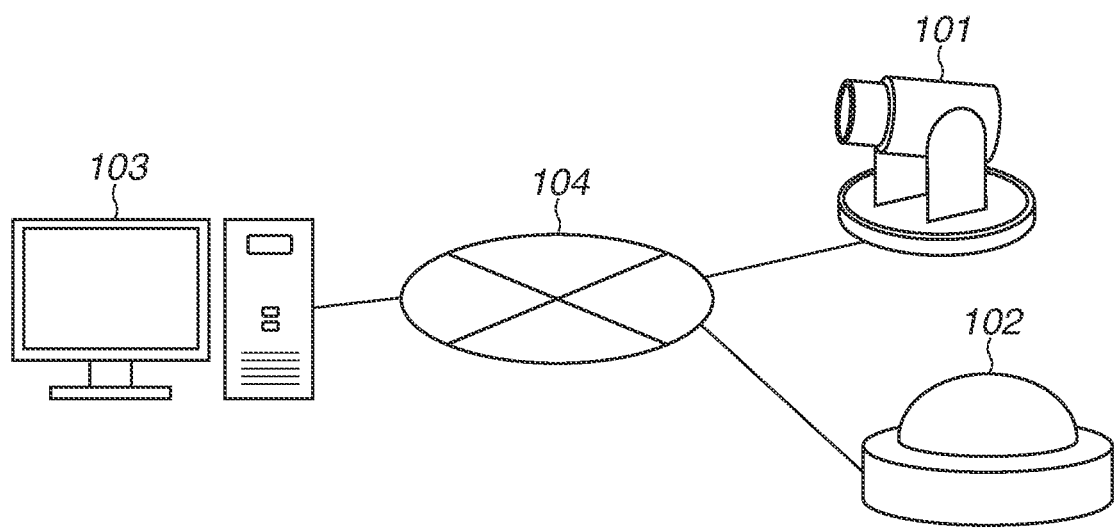
FIG. 1 illustrates an example of a system configuration of a monitoring system.

A first embodiment is provided in the below description. FIG. 1 illustrates an example of a system configuration of a monitoring system according to the present embodiment. The monitoring system according to the present embodiment includes an image capturing apparatus 101, an image capturing apparatus 102, and a client apparatus 103. The image capturing apparatus 101, the image capturing apparatus 102, and the client apparatus 103 are communicably connected to each other via a network 104.

The image capturing apparatus 101 is a pan-tilt-zoom (PTZ) image capturing apparatus which includes pan, tilt, and zoom mechanisms and can change an imaging direction by performing pan, tilt, and zoom drive. The image capturing apparatus 102 is a wide-angle image capturing apparatus including a wide-angle lens such as a fisheye lens.

The client apparatus 103 is an information processing apparatus, such as a personal computer (PC), a server apparatus, a tablet device, and a smartphone, which performs input and output of information between the image capturing apparatus 101 and the image capturing apparatus 102 via the network 104. The network 104 is a network, such as an Internet and a local area network (LAN), but the network is not particularly limited thereto as long as the image capturing apparatus 101, the image capturing apparatus 102, and the client apparatus 103 can communicate with each other via the network. A plurality of the image capturing apparatuses 101 may be installed in the system.

Figure 2:
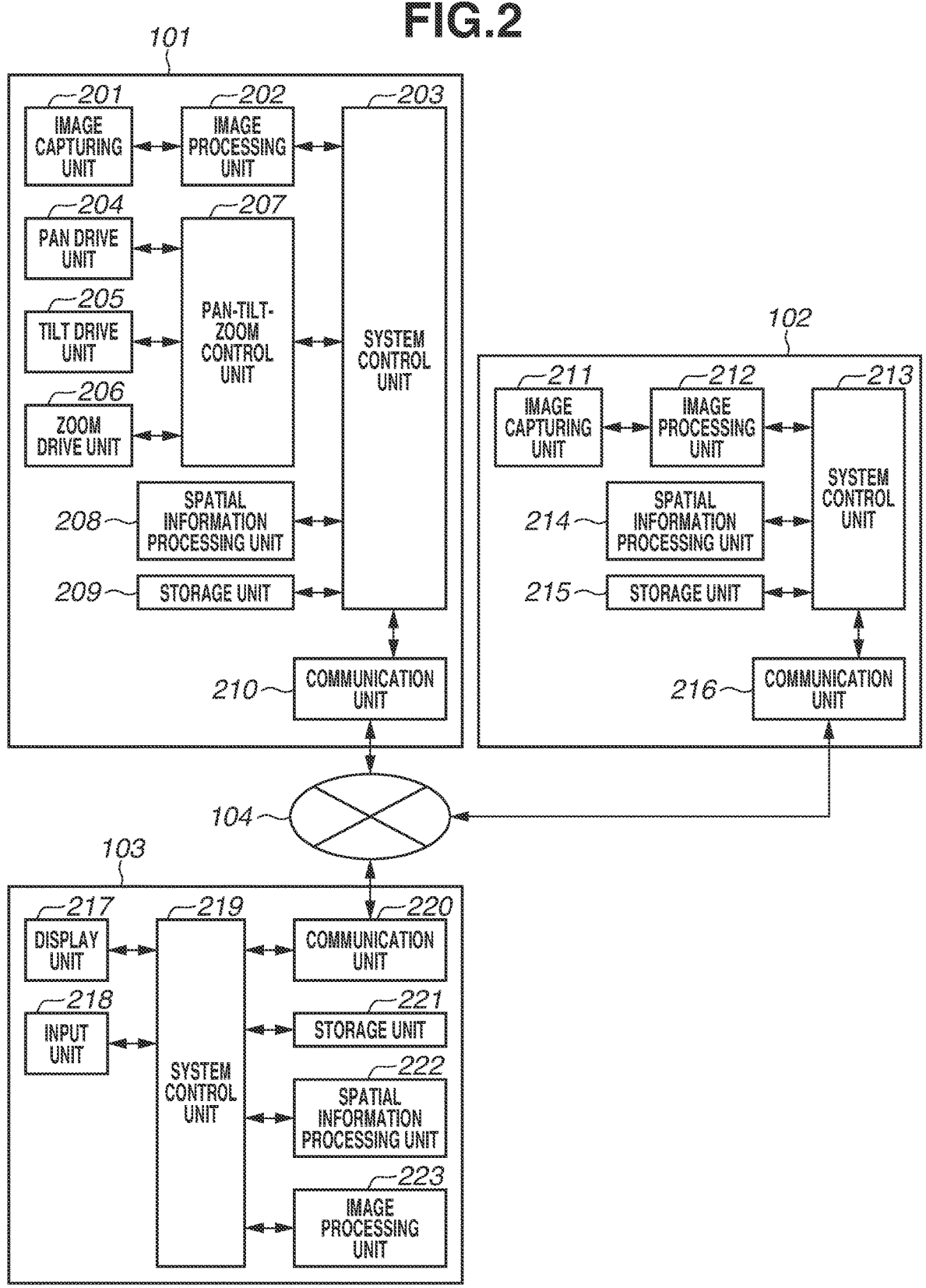
FIG. 2 illustrates an example of a hardware configuration of each element in the monitoring system.

FIG. 2 illustrates an example of a hardware configuration of each element in the monitoring system.

The image capturing apparatus 101 includes an image capturing unit 201, an image processing unit 202, a system control unit 203, a pan drive unit 204, a tilt drive unit 205, a zoom drive unit 206, a pan-tilt-zoom control unit 207, a spatial information processing unit 208, a storage unit 209, and a communication unit 210.

The image capturing unit 201 is a mechanism which includes a lens and an imaging device and captures an image of an object by converting light entering the imaging device via the lens into an electrical signal.

The image processing unit 202 is a processor which generates image data by performing image processing and compression coding processing on the electrical signal converted by the image capturing unit 201 and transmits the generated image data to the system control unit 203.

The system control unit 203 is a control apparatus which includes a central processing unit (CPU) and a main storage device such as a random access memory (RAM) functioning as a work area of the CPU and controls the image capturing apparatus 101. The system control unit 203 transmits the image data generated by the image processing unit 202 to the client apparatus 103 via the communication unit 210. The system control unit 203 further analyzes a camera control command received from the client apparatus 103 via the communication unit 210 and performs processing corresponding to the command. For example, the system control unit 203 instructs the image processing unit 202 to set image quality adjustment and instructs the pan-tilt-zoom control unit 207 to set an imaging parameter such as settings of pan, tilt, and zoom operations.

The pan drive unit 204 is a mechanism which includes a mechanical drive system for performing a pan operation, a motor as a drive source of the mechanical drive system, and an angle sensor for detecting an angle of the pan drive unit 204, drives the mechanical drive system by driving the motor, and changes the imaging direction of the image capturing apparatus 101 to a pan direction.

The tilt drive unit 205 is a mechanism which includes a mechanical drive system for performing a tilt operation, a motor as a drive source of the mechanical drive system, and an angle sensor for detecting an angle of the tilt drive unit, drives the mechanical drive system by driving the motor, and changes the imaging direction of the image capturing apparatus 101 to a tilt direction.

The zoom drive unit 206 is a mechanism which includes a focus lens, a drive unit of a zoom lens, a motor, and a sensor for detecting a position of the zoom lens. The zoom drive unit 206 moves the zoom lens in an optical axis direction by driving of the motor and changes a focal length of the image capturing apparatus 101. Further, the zoom drive unit 206 moves the focus lens in the optical axis direction by driving the motor and performs focusing of the image capturing apparatus 101.

The pan-tilt-zoom control unit 207 is a processor which controls the pan drive unit 204, the tilt drive unit 205, and the zoom drive unit 206 based on an instruction signal transmitted from the system control unit 203. The pan-tilt-zoom control unit 207 can analyze sensor information pieces of the pan drive unit 204, the tilt drive unit 205, and the zoom drive unit 206 and obtain a pan angle, a tilt angle, and a zoom angle of the image capturing apparatus 101.

The pan-tilt-zoom control unit 207 instructs the pan drive unit 204, the tilt drive unit 205, and the zoom drive unit 206 to perform pan, tilt, and zoom operations, respectively, based on an instruction signal transmitted from the system control unit 203. Further, the pan-tilt-zoom control unit 207 obtains the pan angle, the tilt angle, and the zoom angle of the image capturing apparatus 101 from the pan drive unit 204, the tilt drive unit 205, and the zoom drive unit 206, respectively, and transmits the pan angle, the tilt angle, and the zoom angle to the system control unit 203 in response to a request from the system control unit 203.

The spatial information processing unit 208 is a processor which executes processing regarding three-dimensional positions of the image capturing apparatus 101 and the image capturing apparatus 102 so as to realize a coordination function of the image capturing apparatus 101 and the image capturing apparatus 102. More specifically, the spatial information processing unit 208 performs processing for estimating a position of itself from a feature point on a captured image. The image capturing apparatus 101 may not include the spatial information processing unit 208 therein and may execute the processing of the spatial information processing unit 208 via the system control unit 203.

The storage unit 209 is a storage device which stores a parameter of image quality adjustment, a setting value for setting the network, data of a captured image, various programs, and the like. The system control unit 203 can control the image capturing apparatus 101 using a previously set value stored in the storage unit 209 in a case where the image capturing apparatus 101 is restarted. The storage unit 209 is, for example, a read-only memory (ROM), a hard disk drive (HDD), a solid state drive (SSD), and a flash memory.

The communication unit 210 is an interface which is used for communication with an external apparatus such as the image capturing apparatus 102 and the client apparatus 103 via the network 104.

Figure 5:
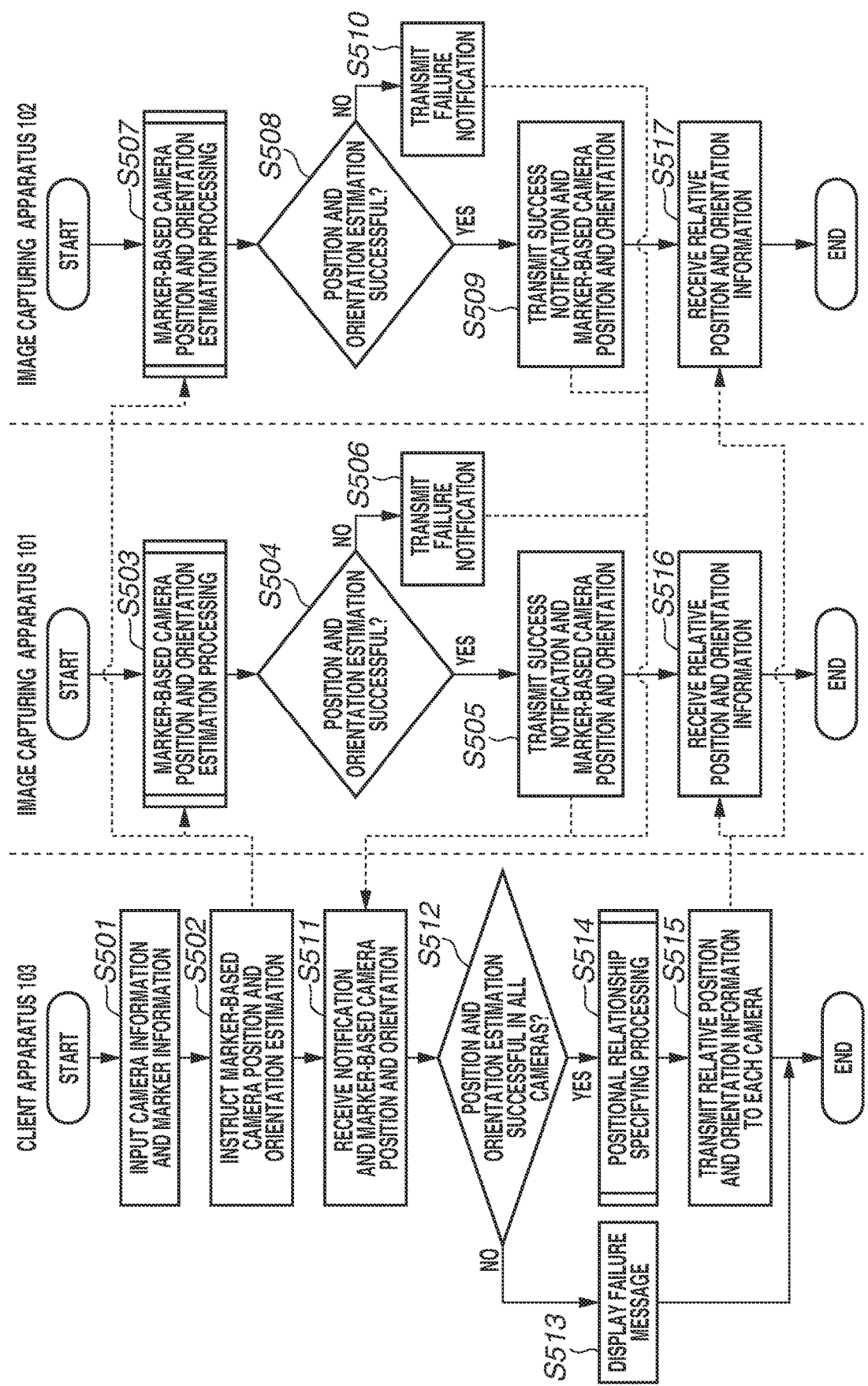
FIG. 5 is a flowchart illustrating an example of processing performed in the monitoring system.

The system control unit 203 executes processing according to a program stored in the storage unit 209, and a function of the image capturing apparatus 101, processing in a flowchart in FIG. 6, and processing by the image capturing apparatus 101 in flowcharts in FIGS. 5 and 10 are realized thereby.

The image capturing apparatus 102 includes an image capturing unit 211, an image processing unit 212, a system control unit 213, a spatial information processing unit 214, a storage unit 215, and a communication unit 216.

The image capturing unit 211 is a mechanism which includes a lens and an imaging device and captures an image of an object by converting light entering the imaging device via the lens into an electrical signal. The image capturing unit 211 further includes a wide-angle lens having a hemispherical viewing angle.

The image processing unit 212 is a processor which generates image data by performing image processing and compression coding processing on the electrical signal converted by the image capturing unit 211 and transmits the generated image data to the system control unit 213.

The system control unit 213 is a control apparatus which includes a CPU and a main storage device functioning as a work area of the CPU and controls the image capturing apparatus 102. The system control unit 213 transmits the image data generated by the image processing unit 212 to the client apparatus 103 via the communication unit 216. The system control unit 213 further analyzes a camera control command received from the client apparatus 103 via the communication unit 216 and performs processing corresponding to the command. For example, the system control unit 213 instructs the image processing unit 212 to set an imaging parameter such as a setting of image quality adjustment.

The spatial information processing unit 214 is a processor which executes processing regarding the three-dimensional positions of the image capturing apparatus 101 and the image capturing apparatus 102 so as to realize the coordination function between the image capturing apparatus 101 and the image capturing apparatus 102. More specifically, the spatial information processing unit 214 performs processing for estimating a position of itself from a feature point on a captured image. The image capturing apparatus 102 may not include the spatial information processing unit 214 and may execute the processing of the spatial information processing unit 214 via the system control unit 213.

The storage unit 215 is a storage device which stores a parameter of image quality adjustment, a setting value for setting the network, various programs, and the like. The system control unit 213 can control the image capturing apparatus 102 using a previously set value stored in the storage unit 215 even in a case where the image capturing apparatus 102 is restarted. The storage unit 215 is, for example, a ROM, an HDD, an SSD, and a flash memory.

The communication unit 216 is an interface which is used for communication with an external apparatus, such as the image capturing apparatus 101 and the client apparatus 103, via the network 104.

The system control unit 213 executes processing according to a program stored in the storage unit 215, and thus a function of the image capturing apparatus 102, the processing in the flowchart in FIG. 6, and processing by the image capturing apparatus 102 in the flowcharts in FIGS. 5 and 10 are realized thereby.

The client apparatus 103 includes a display unit 217, an input unit 218, a system control unit 219, a communication unit 220, a storage unit 221, a spatial information processing unit 222, and an image processing unit 223.

The display unit 217 is a display apparatus such as a liquid crystal display apparatus and displays image data received from the image capturing apparatus 101 and the image capturing apparatus 102. The display unit 217 further displays a graphical user interface (hereinbelow, referred to as a GUI) used for controlling the image capturing apparatus 101 and the image capturing apparatus 102. The GUI is used for, for example, setting a zoom ratio of the image capturing apparatus 101, changing pan and tilt directions, and instructing the image capturing apparatus 101 and the image capturing apparatus 102 to capture images. The input unit 218 is an input device, such as a keyboard, a mouse, and a touch panel. A user of the client apparatus 103 operates the GUI via the input unit 218.

The system control unit 219 is a control apparatus which includes a CPU and a main storage device functioning as a work area of the CPU and controls the client apparatus 103. The system control unit 219 receives image data transmitted from the image capturing apparatus 101 and the image capturing apparatus 102 via the communication unit 220. The system control unit 219 transmits a control command to the image capturing apparatus 101 and the image capturing apparatus 102 via the communication unit 220 and thus issues an instruction to set an imaging parameter for setting image quality adjustment, an instruction for pan, tilt, and zoom operations, and the like.

The communication unit 220 is an interface which is used for communication with an external apparatus, such as the image capturing apparatus 101 and the image capturing apparatus 102, via the network 104.

The storage unit 221 is a storage device, such as a ROM, an HDD, an SSD, and a flash memory, which stores information such as Internet Protocol (IP) addresses of the image capturing apparatus 101 and the image capturing apparatus 102, information of network setting, and various programs. The system control unit 219 can control the client apparatus 103 using a previously set value stored in the storage unit 221 even in a case where the client apparatus 103 is restarted.

The spatial information processing unit 222 is a processor which executes processing regarding the three-dimensional positions of the image capturing apparatus 101 and the image capturing apparatus 102 so as to realize the coordination function between the image capturing apparatus 101 and the image capturing apparatus 102. More specifically, the spatial information processing unit 222 executes processing such as processing for specifying a positional relationship between the image capturing apparatus 101 and the image capturing apparatus 102 based on position information of each of the image capturing apparatus 101 and the image capturing apparatus 102. The client apparatus 103 may not include the spatial information processing unit 222 and may execute the processing of the spatial information processing unit 222 via the system control unit 219.

The image processing unit 223 is a processor which executes various types of image processing. For example, the image processing unit 223 executes processing for displaying an image transmitted from each image capturing apparatus on the display unit 217 as the GUI and processing for extracting coordinates on the image based on an input via the input unit 218. The client apparatus 103 may not include the image processing unit 223 and may execute the processing of the image processing unit 223 via the system control unit 219.

Figure 9:
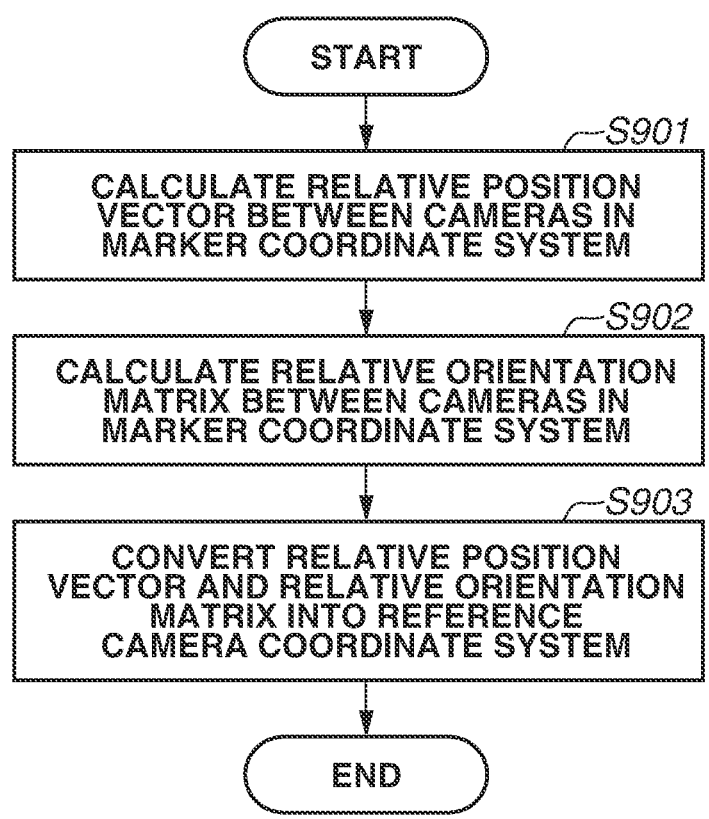
FIG. 9 is a flowchart illustrating an example of positional relationship specifying processing.

The system control unit 219 executes processing according to a program stored in the storage unit 221, and a function of the client apparatus 103, processing in a flowchart in FIG. 9, and processing by the client apparatus 103 in the flowcharts in FIGS. 5 and 10 are realized thereby.

Figure 3:
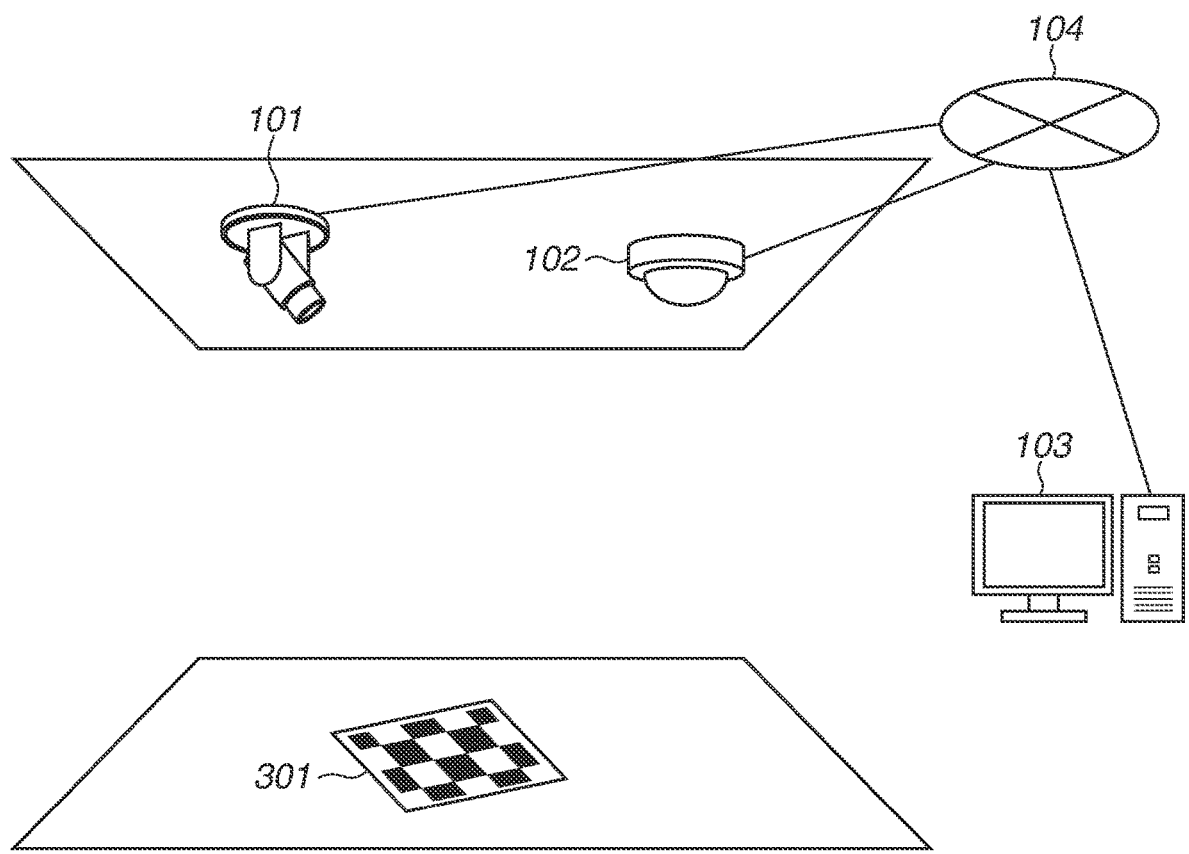
FIG. 3 illustrates an example of an environment in a case where a positional relationship between image capturing apparatuses is specified.

FIG. 3 illustrates an example of an environment in a case where the positional relationship between the image capturing apparatus 101 and the image capturing apparatus 102 is specified. The image capturing apparatus 101 and the image capturing apparatus 102 are communicable with the client apparatus 103 via the network 104. According to the present embodiment, a marker 301 in which a predetermined pattern is drawn is horizontally placed on a floor as an object including a feature point which is easily detected. The pattern drawn in the marker 301 is described in detail below with reference to FIGS. 4A and 4B.

The image capturing apparatus 101 obtains image data by capturing images of the marker 301 using the image capturing unit 201 and the image processing unit 202 and analyzes the obtained image data via the spatial information processing unit 208. Accordingly, the image capturing apparatus 101 specifies a position of the image capturing apparatus 101 in a coordinate system defined based on the marker 301. The coordinate system defined based on the marker 301 is, for example, a coordinate system which includes a point determined based on the marker 301 as an origin and is defined so as to change an orientation according to a change in an orientation of the marker 301. In following descriptions, the coordinate system defined based on the marker 301 is referred to as a marker coordinate system.

The image capturing apparatus 102 captures an image of the marker 301 using the image capturing unit 211 and the image processing unit 212 and analyzes the captured image via the spatial information processing unit 214. Accordingly, the image capturing apparatus 102 specifies a position of the image capturing apparatus 102 in the marker coordinate system.

Figure 4A:
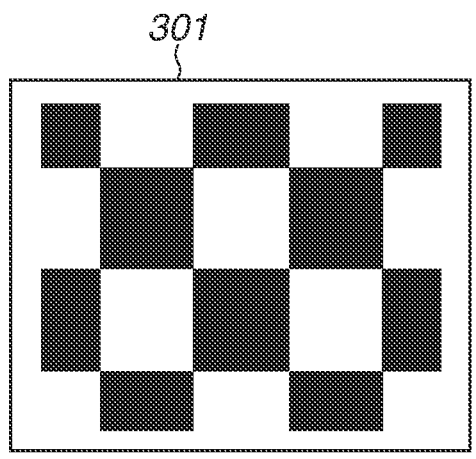
FIGS. 4A and 4B illustrate an example of a marker.

FIG. 4A illustrates an example of a pattern (design) drawn in the marker 301. In the marker 301, a black and white chessboard pattern is drawn as illustrated in FIG. 4A. It is assumed that a size of a square and the number of squares in horizontal and vertical rows of the chessboard illustrated in the pattern are known. Further, the number of squares in the pattern on the chessboard are an odd number by an even number, so that the pattern of the marker 301 does not have rotational symmetry. Therefore, each of the image capturing apparatuses 101 and 102 captures and analyzes an image of the pattern of the marker 301 and can estimate not only a position but also an orientation of the own camera.

Figure 4B:
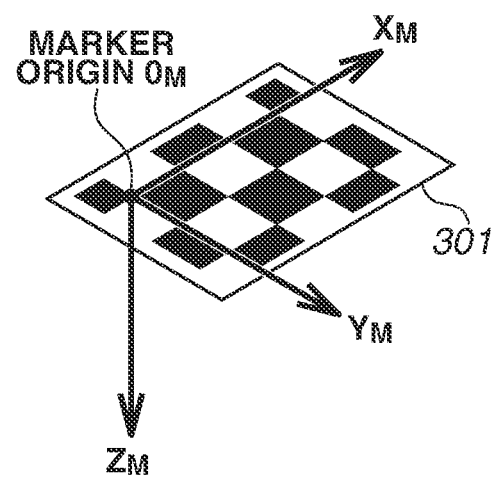

FIG. 4B illustrates an example of the marker coordinate system. An upper left corner (a corner of the square) in the chessboard pattern in FIG. 4A is defined as an origin $O_M$. Based on the origin $O_M$, the right direction is defined as an $X_M$ axis direction, the downward direction is defined as a $Y_M$ axis direction, and the depth direction is defined as a $Z_M$ axis direction in the chessboard pattern. According to the present embodiment, the marker coordinate system is a coordinate system which includes the point $O_M$ as the origin and is defined by these three axes.

The pattern of the marker 301 and the coordinate system defined based on the marker 301 illustrated in FIGS. 4A and 4B are only examples. The marker 301 may include another pattern such as a honeycomb pattern. Further, the marker 301 may be a three-dimensional marker instead of a two-dimensional marker. Furthermore, a plurality of the markers 301 may be included.

FIG. 5 is a flowchart illustrating an example of positional relationship specifying processing. Processing that the monitoring system specifies the positional relationship between the image capturing apparatus 101 and the image capturing apparatus 102 in the environment illustrated in FIG. 3 is described with reference to FIG. 5. The flowchart in FIG. 5 includes three rows. The left side portion of the flowchart represents processing performed by the client apparatus 103, the center portion of the flowchart represents processing performed by the image capturing apparatus 101, and the right side portion of the flowchart represents processing performed by the image capturing apparatus 102. Dashed line arrows in FIG. 5 represent communication that has been performed.

In step S501, the system control unit 219 receives designation indicating that the image capturing apparatus 101 and the image capturing apparatus 102 are used for monitoring based on a user operation via the input unit 218. The system control unit 219 further receives designation indicating that the marker 301 is used for specifying the positional relationship between the image capturing apparatus 101 and the image capturing apparatus 102 based on a user operation via the input unit 218. Then, the system control unit 219 starts setup of the monitoring system.

In step S502, the system control unit 219 transmits a command instructing camera position and orientation estimation based on the marker 301 to each of the image capturing apparatus 101 and the image capturing apparatus 102. At that time, the system control unit 219 transmits information on the marker 301 designated in step S501 together with the command.

Processing performed by the image capturing apparatus 101 upon receipt of the command transmitted in step S502 is described with reference to the flowchart in the center of FIG. 5.

In step S503, the system control unit 203 receives the command and the information on the marker 301 transmitted from the client apparatus 103 and executes position and orientation estimation processing for estimating a position and orientation of the image capturing apparatus 101 based on the marker 301. The position and orientation estimation processing is described in detail below with reference to FIGS. 6, 7A, and 7B.

In step S504, the system control unit 203 determines whether the position and orientation estimation processing executed in step S503 has been successful. If the system control unit 203 determines that the position and orientation estimation processing executed in step S503 has been successful (YES in step S504), the processing proceeds to step S505. If the system control unit 203 determines that the position and orientation estimation processing executed in step S503 has failed (NO in step S504), the processing proceeds to step S506.

In step S505, the system control unit 203 transmits, to the client apparatus 103, a success notification indicating that the position and orientation estimation processing of the image capturing apparatus 101 has been successful. The system control unit 203 transmits, to the client apparatus 103, pieces of information about the position and the orientation of the image capturing apparatus 101 obtained by the processing in step S503 together with the success notification. In the following description, the pieces of information about the position and the orientation are collectively referred to as position and orientation information.

In step S506, the system control unit 203 transmits a failure notification indicating that the position and orientation estimation processing of the image capturing apparatus 101 has failed to the client apparatus 103.

Processing performed by the image capturing apparatus 102 upon receipt of the command transmitted in step S502 is described with reference to the flowchart on the right side of FIG. 5.

In step S507, the system control unit 213 receives the command and the information on the marker 301 transmitted from the client apparatus 103 and executes position and orientation estimation processing for estimating a position and orientation of the image capturing apparatus 102 based on the marker 301. The position and orientation estimation processing is described in detail below with reference to FIGS. 6, 7A, and 7B.

In step S508, the system control unit 213 determines whether the position and orientation estimation processing executed in step S507 has been successful. If the system control unit 213 determines that the position and orientation estimation processing executed in step S507 has been successful (YES in step S508), the processing proceeds to step S509. If the system control unit 213 determines that the position and orientation estimation processing executed in step S507 has failed (NO in step S508), the processing proceeds to step S510.

In step S509, the system control unit 213 transmits, to the client apparatus 103, a success notification indicating that the position and orientation estimation processing of the image capturing apparatus 102 has been successful. The system control unit 213 transmits, to the client apparatus 103, the position and orientation information on the image capturing apparatus 102 obtained by the processing in step S507 together with the success notification.

In step S510, the system control unit 213 transmits, to the client apparatus 103, a failure notification indicating that the position and orientation estimation processing of the image capturing apparatus 102 has failed.

The description returns to the processing by the client apparatus 103.

In step S511, the system control unit 219 receives the information transmitted from the image capturing apparatus 101 in step S505 or S506. Further, the system control unit 219 receives the information transmitted from the image capturing apparatus 102 in step S509 or S510.

In step S512, the system control unit 219 determines whether the success notifications indicating success of the position and orientation estimation processing are received from both of the image capturing apparatus 101 and the image capturing apparatus 102 in step S511. The processing proceeds to step S514 in a case where the system control unit 219 determines that the success notifications indicating the success of the position and orientation estimation processing are received from both of the image capturing apparatus 101 and the image capturing apparatus 102 in step S511 (YES in step S512). The processing proceeds to step S513 in a case where the system control unit 219 determines that the failure notification indicating failure of the position and orientation estimation processing is received from either of the image capturing apparatus 101 and the image capturing apparatus 102 in step S511 (NO in step S512).

In step S513, the system control unit 219 displays a failure message indicating that processing for specifying the positional relationship between the image capturing apparatus 101 and the image capturing apparatus 102 has failed on the display unit 217, and the processing in FIG. 5 is terminated.

In step S514, the system control unit 219 specifies the positional relationship between the image capturing apparatus 101 and the image capturing apparatus 102 based on the position and orientation information received from each of the image capturing apparatus 101 and the image capturing apparatus 102. The positional relationship specifying processing performed in step S514 is described in detail below with reference to FIG. 9. In step S515, the system control unit 219 transmits information representing the positional relationship specified in step S514 to the image capturing apparatus 101 and the image capturing apparatus 102. The information representing the positional relationship is referred to as positional relationship information in the following description.

In step S516, the system control unit 203 receives the positional relationship information transmitted from the client apparatus 103 in step S515 and stores the received information in the storage unit 209.

In step S517, the system control unit 213 receives the positional relationship information transmitted from the client apparatus 103 in step S515 and stores the received information in the storage unit 215.

According to the present embodiment, the position and orientation estimation processing in steps S503 and S507 is respectively performed by the image capturing apparatus 101 and the image capturing apparatus 102 in response to the instruction from the client apparatus 103. However, the client apparatus 103 may execute position and orientation estimation processing similar to that in steps S503 and S507 based on images transmitted from the image capturing apparatus 101 and the image capturing apparatus 102.

FIG. 6 is a flowchart illustrating an example of the position and orientation estimation processing for estimating the position and the orientation of the image capturing apparatus based on the marker 301. The position and orientation estimation processing in steps S503 and S507 in the flowchart in FIG. 5 is described in detail with reference to FIG. 6. Processing in step S605 in the flowchart in FIG. 6 is executed by the image capturing apparatus 101, but is not executed by the image capturing apparatus 102. Other pieces of processing in the flowchart in FIG. 6 are executed both of the image capturing apparatus 101 and the image capturing apparatus 102.

In step S601, the system control unit 203 (213) captures an image of a surrounding environment and obtains image data via the image capturing unit 201 (211) and the image processing unit 202 (212).

In step S602, the system control unit 203 (213) determines whether the marker 301 is captured in the image data obtained in step S601 based on the information on the marker 301 transmitted from the client apparatus 103 via the image processing unit 202 (212). For example, the system control unit 203 (213) performs processing for detecting the marker 301 from the image data obtained in step S601. The system control unit 203 (213) determines that the marker 301 is captured in a case where the marker 301 is detected and determines that the marker 301 is not captured in a case where the marker 301 is not detected. If the system control unit 203 (213) determines that the marker 301 is captured in the image data obtained in step S601 (YES in step S602), the processing proceeds to step S603. If the system control unit 203 (213) determines that the marker 301 is not captured in the image data obtained in step S601 (NO in step S602), the processing proceeds to step S607.

In step S603, the system control unit 203 (213) extracts coordinates of a predetermined feature point in the image in the image data obtained in step S601 (coordinates in a coordinate system of the image) via the image processing unit 202 (212). According to the present embodiment, the feature point is a point on each corner of the pattern on the chessboard in the marker 301. The coordinates of the feature point are coordinates of a pixel where the corner of the marker 301 is captured in the image. The marker 301 includes twelve points of corners, so that the system control unit 203 (213) extracts two-dimensional coordinates of the twelve points.

In step S604, the system control unit 203 (213) estimates a position and an orientation of the image capturing apparatus 101 (102) in the marker coordinate system defined based on the marker 301, based on the coordinates of the feature points extracted in step S603 via the spatial information processing unit 208 (214). The system control unit 203 (213) estimates the position and the orientation of the image capturing apparatus 101 (102) in the marker coordinate system using, for example, an algorithm described in Japanese Patent Application Laid-Open No. 2006-242943.

The system control unit 203 (213) estimates a position of an origin of a coordinate system defined based on the image capturing apparatus 101 (102) in the marker coordinate system and an orientation of the coordinate system as the position and the orientation of the image capturing apparatus 101 (102). The coordinate system defined based on the image capturing apparatus 101 (102) is, for example, a coordinate system which includes a point determined as an origin based on the image capturing apparatus 101 (102) and changes its orientation (inclination of each coordinate axis) according to a change in the orientation of the image capturing apparatus 101 (102). The system control unit 203 (213) estimates a position of an origin of a coordinate system defined based on the lens of the image capturing unit 201 (213) and an orientation of the coordinate system which is an example of the coordinate system defined based on the image capturing apparatus 101 (102). In the following description, the coordinate system defined based on the lens of the image capturing apparatus is referred to as a lens coordinate system.

The system control unit 203 (213) uses the lens coordinate system of the image capturing apparatus as a coordinate system representing the position and the orientation of the image capturing apparatus. More specifically, the system control unit 203 (213) uses the position of the origin in the lens coordinate system as the position of the image capturing apparatus and the orientation of the lens coordinate system as the orientation of the image capturing apparatus.

The system control unit 203 (213) obtains data of a three-dimensional translation vector $T_L$ as expressed in following Formula (1) as position data indicating the position of the image capturing apparatus 101 (102). Each element of the vector $T_L$ in Formula (1) represents a coordinate value of coordinates of a point predetermined on the image capturing apparatus 101 (102) in the marker coordinate system. The vector $T_L$ is a vector from the origin of the marker coordinate system to the origin of the lens coordinate system of the image capturing apparatus 101 (102) in the marker coordinate system.

$$T_L = \begin{bmatrix} T_{LX} \\ T_{LY} \\ T_{LZ} \end{bmatrix} \quad (1)$$

The system control unit 203 (213) obtains data of a three by three matrix $R_L$ as expressed in following Formula (2) as orientation data representing the orientation of the image capturing apparatus 101 (102). The matrix $R_L$ in Formula (2) is a transformation matrix for transforming the marker coordinate system defined based on the marker 301 into the lens coordinate system of the image capturing apparatus 101 (102). A direction of each axis of the lens coordinate system of the image capturing apparatus 101 (102) varies depending on the orientation of the image capturing apparatus 101 (102). Thus, the matrix $R_L$ has a correspondence relationship with the orientation of the image capturing apparatus 101 (102) and can be interpreted as information representing the orientation of the image capturing apparatus 101 (102).

$$R_L = \begin{bmatrix} R_{L11} & R_{L12} & R_{L13} \\ R_{L21} & R_{L22} & R_{L23} \\ R_{L31} & R_{L32} & R_{L33} \end{bmatrix} \quad (2)$$

In step S605, the system control unit 203 corrects the coordinate system representing the position and the orientation of the image capturing apparatus 101 from the lens coordinate system of the image capturing apparatus 101 to a coordinate system which is not affected by a pan-tilt drive of the image capturing apparatus 101. The processing in step S605 is described in detail below with reference to FIGS. 7A, 7B, 8A, and 8B.

In step S606, the system control unit 203 (213) returns a success flag indicating success in the position and orientation estimation processing (for example, stores information of the success flag in the storage unit 209 (215)), and the processing in FIG. 6 is ended.

In step S607, the system control unit 203 (213) returns a failure flag indicating failure in the position and orientation estimation processing (for example, stores information of the failure flag in the storage unit 209 (215)).

In step S504 (S508), the system control unit 203 (213) determines whether the position and orientation estimation processing has been successful or failed based on, for example, whether the success flag or the failure flag is stored in the storage unit 209 (215).

FIGS. 7A and 7B illustrate an example of a structure of the image capturing apparatus 101 which is the PTZ image capturing apparatus. FIGS. 8A and 8B illustrate an example of the lens coordinate system defined based on the image capturing apparatus 101. In the following description, the processing in step S605 in the flowchart in FIG. 6 is described in detail with reference to FIGS. 7A, 7B, 8A, and 8B.

First, the structure of the image capturing apparatus 101 is described with reference to FIGS. 7A and 7B. FIG. 7A illustrates the image capturing apparatus 101 of which a bottom surface is placed on the ground when viewed directly from the above in a vertical direction of the image capturing apparatus 101. FIG. 7B is a side view of the image capturing apparatus 101 of which the bottom surface is placed on the ground.

A bottom case 701 is a case for storing hardware components of the image capturing apparatus 101 and is fixed to an installation surface of the image capturing apparatus 101. A turntable 702 is a mechanism which rotates on the bottom case 701 to change the imaging direction of the image capturing apparatus 101 to the pan direction. A support 703 is a pillar supporting a camera head 704. The camera head 704 is a portion in which the image capturing unit 201 is stored. The pan drive unit 204 rotates the turntable 702 in a horizontal direction with respect to the bottom case 701 and thereby changes the imaging direction of the image capturing apparatus 101 to the pan direction. According to the present embodiment, the pan drive unit 204 can rotate the turntable 702 in the left and right directions from −175 degrees to +175 degrees when by regarding a reference direction as 0 degree. The tilt drive unit 205 rotates the camera head 704 in the vertical direction centering on a point at which the camera head 704 is fixed to the support 703 mounted on the turntable 702, and accordingly the imaging direction of the image capturing apparatus 101 is changed to the tilt direction. According to the present embodiment, the tilt drive unit 205 can rotate the camera head 704 from 0 degree in the horizontal direction to 90 degrees in a direction perpendicular to the horizontal direction.

Next, the coordinate system defined based on the image capturing apparatus 101 is described with reference to FIGS. 8A and 8B. FIG. 8A is a diagram illustrating the image capturing apparatus 101 when viewed directly from the above thereof, as with FIG. 7A. FIG. 8B is a side view of the image capturing apparatus 101, as with FIG. 7B.

It is assumed that the image capturing apparatus 101 has a pan angle θ and a tilt angle φ. In this case, the lens coordinate system of the image capturing apparatus 101 used in the processing in step S604 is, for example, a coordinate system as follows. Specifically, a coordinate system includes a lens principal point 801 of the image capturing unit 201 as an origin and is defined by an $X_L$ axis horizontal to a negative direction of the pan drive, a $Y_L$ axis horizontal to a positive direction of the tilt drive, and a $Z_L$ axis in a lens optical axis direction.

The image capturing apparatus 101 obtains a transformation system for transforming the marker coordinate system to the lens coordinate system of the image capturing apparatus 101 described with reference to FIG. 3 and thus calculates position data ($T_L$) and orientation data ($R_L$) of the image capturing apparatus 101 in the marker coordinate system. In other words, the position data $T_L$ is a three-dimensional translation vector for translating from an origin $O_M$ of the marker coordinate system to an origin $O_L$ of the lens coordinate system. Further, lens orientation data $R_L$ is a three by three rotation matrix representing transformation from the marker coordinate system to the lens coordinate system.

However, the image capturing apparatus 101 can perform the pan-tilt drive, so that the lens coordinate system itself is affected by the pan-tilt drive, and positions of the coordinate axes and the origin $O_L$ of the lens coordinate system are changed when viewed based on the marker coordinate system. Therefore, in a case where the position and the orientation of the image capturing apparatus 101 are expressed using the lens coordinate system of the image capturing apparatus 101, the position and the orientation of the image capturing apparatus 101 in the marker coordinate system are changed by the pan-tilt drive of the image capturing apparatus 101, and an error occurs. There is an issue that accuracy of specifying a relative positional relationship between the image capturing apparatus 101 and the image capturing apparatus 102 is deteriorated by the error. The issue is caused by using a coordinate system (the lens coordinate system) which varies by the pan-tilt drive of the image capturing apparatus 101 to express the position and the orientation of the image capturing apparatus 101.

Thus, in the monitoring system according to the present embodiment, the position and the orientation of the image capturing apparatus 101 are expressed using a coordinate system which does not vary by the pan-tilt drive of the image capturing apparatus 101.

An example of a coordinate system defined based on the image capturing apparatus 101 which is not affected by the pan-tilt drive is described with reference to FIGS. 8A and 8B. In the following description, the coordinate system defined based on the image capturing apparatus 101 which is not affected by the pan-tilt drive is referred to as a camera coordinate system. First, an intersection 802 of a pan drive axis and a tilt drive axis of the image capturing apparatus 101 is defined as an origin $O_C$ of the camera coordinate system.

A position of the intersection 802 ($O_C$) of the pan drive axis and the tilt drive axis of the image capturing apparatus 101 does not vary by the pan-tilt drive of the image capturing apparatus 101. Thus, position data of the image capturing apparatus 101 as a vector from the origin of the marker coordinate system to the origin $O_C$ is not affected by the pan angle θ and the tilt angle φ of the image capturing apparatus 101.

A distance d from the lens principal point 801 to the origin $O_C$ is stored in the storage unit 209 as known data. Coordinate axes of the camera coordinate system are an $X_C$ axis, a $Y_C$ axis, and a $Z_C$ axis. A direction of the $Z_C$ axis is an optical axis direction in a case where the pan angle θ and the tilt angle φ of the image capturing apparatus 101 are respectively 0 degree and +90 degrees. A direction of the $X_C$ axis is a direction in a case where the pan angle θ of the image capturing apparatus 101 is −90 degrees. A direction of the $Y_C$ axis is a direction in a case where the pan angle θ is −180 degrees.

The monitoring system uses the camera coordinate system of the image capturing apparatus 101 as a coordinate system representing the position and the orientation of the image capturing apparatus 101. More specifically, the monitoring system uses the origin of the camera coordinate system of the image capturing apparatus 101 as the position of the image capturing apparatus 101 and an orientation of the camera coordinate system of the image capturing apparatus 101 as the orientation of the image capturing apparatus 101.

The position data of the image capturing apparatus 101 to be calculated is a translation vector for translating from the origin $O_M$ of the marker coordinate system to the camera origin $O_C$. Further, the orientation data of the image capturing apparatus 101 to be calculated is a rotation matrix representing transformation from the marker coordinate system to the camera coordinate system. The system control unit 203 re-calculates, in step S605, position data $T_C$ and orientation data $R_C$ of the image capturing apparatus 101 via the spatial information processing unit 208 using lens position data $T_L$, the lens orientation data $R_L$, the pan angle θ, the tilt angle φ, and the distance d. The system control unit 203 can obtain the pan angle θ and the tilt angle (p by inquiring of the pan-tilt-zoom control unit 207.

More specifically, the system control unit 203 calculates the position data $T_C$ using following Formula (3).

$$T_C = \begin{bmatrix} T_{CX} \\ T_{CY} \\ T_{CZ} \end{bmatrix} = \begin{bmatrix} T_{LX} \\ Z_{LY} \\ T_{LY} + d \end{bmatrix} \quad (3)$$

In the following description, a vector expressed by the position data $T_C$ is referred to as a camera position vector. Further, the system control unit 203 calculates the orientation data $R_C$ of the image capturing apparatus 101 using following Formula (4).

$$R_C = \begin{bmatrix} R_{C11} & R_{C12} & R_{C13} \\ R_{C21} & R_{C22} & R_{C23} \\ R_{C31} & R_{C32} & R_{C33} \end{bmatrix} = \quad (4)$$

$$R_L \begin{bmatrix} 1 & 0 & 0 \\ 0 & \sin\varphi & \cos\varphi \\ 0 & -\cos\varphi & \sin\varphi \end{bmatrix} \begin{bmatrix} \cos\theta & -\sin\theta & 0 \\ \sin\theta & \cos\theta & 0 \\ 0 & 0 & 1 \end{bmatrix}$$

In the following description, a matrix indicating the orientation data is referred to as an orientation matrix.

The system control unit 203 can calculate the position and orientation data of the image capturing apparatus 101 which is not affected by the pan angle θ and the tilt angle φ by the above-described processing and thus can improve accuracy of subsequent processing.

According to the present embodiment, as the coordinate system which does not vary by the pan-tilt drive of the image capturing apparatus 101, the system control unit 203 uses the coordinate system which includes the intersection of the pan drive axis and the tilt drive axis as the origin. However, the system control unit 203 may use a coordinate system which includes a point other than the intersection of the pan drive axis and the tilt drive axis as an origin as the coordinate system which does not vary by the pan-tilt drive of the image capturing apparatus 101. For example, the system control unit 203 may use a coordinate system which includes a point designated on the bottom case 701 as an origin.

According to the present embodiment, the image capturing apparatus 102 is described as an image capturing apparatus which cannot perform a pan-tilt drive since an imaging direction thereof is fixed. However, the image capturing apparatus 102 may be an image capturing apparatus which can perform a pan-tilt drive and change the imaging direction. In that case, the monitoring system expresses the position and the orientation of the image capturing apparatus 102 using a camera coordinate system of the image capturing apparatus 102 defined based on a coordinate system which does not vary by the pan-tilt drive of the image capturing apparatus 102, as with the coordinate system described with reference to FIGS. 7A, 7B, 8A, and 8B. More specifically, the monitoring system uses a position of an origin of the camera coordinate system of the image capturing apparatus 102 as the position of the image capturing apparatus 102 and inclination of the camera coordinate system of the image capturing apparatus 102 as the orientation of the image capturing apparatus 102.

FIG. 9 is a flowchart illustrating an example of positional relationship specifying processing for specifying the positional relationship between the image capturing apparatus 101 and the image capturing apparatus 102. The processing in step S514 is described in detail with reference to FIG. 9. The system control unit 219 executes the processing in FIG. 9 via the spatial information processing unit 222. According to the present embodiment, the positional relationship between the image capturing apparatus 101 and the image capturing apparatus 102 is expressed as position and orientation data of either one of the image capturing apparatus 101 and the image capturing apparatus 102 which serves as a reference with respect to the other image capturing apparatus. In the following description, either of the image capturing apparatus 101 and the image capturing apparatus 102 which serves as the reference is referred to as a reference image capturing apparatus.

According to the present embodiment, the system control unit 219 defines the image capturing apparatus 102 as the reference image capturing apparatus. The system control unit 219 obtains the position data pieces (position vectors) and the pieces of orientation data (orientation matrices) in the respective marker coordinate systems of the image capturing apparatus 101 and the image capturing apparatus 102 transmitted in steps S505 and S509 before performing the processing in FIG. 9.

In step S901, the system control unit 219 calculates a relative position vector in the marker coordinate system. The relative position vector is a position vector of the other image capturing apparatus (the image capturing apparatus 101) viewed from the reference image capturing apparatus (the image capturing apparatus 102). A relative position vector $T_{RM}$ in the marker coordinate system is calculated by following Formula (5), where $T_{BASE}$ is a position vector of the image capturing apparatus 102 in the marker coordinate system, and $T_{PTZ}$ is a position vector of the image capturing apparatus 101 in the marker coordinate system. The system control unit 219 calculates the relative position vector $T_{RM}$ using Formula (5).

$$T_{RM} = T_{PTZ} - T_{BASE} \quad (5)$$

A matrix representing transformation from an orientation matrix of the reference image capturing apparatus (the image capturing apparatus 102) in the marker coordinate system to an orientation matrix of the other image capturing apparatus (the image capturing apparatus 101) in the marker coordinate system is referred to as a relative orientation matrix.

In step S902, the system control unit 219 calculates the relative orientation matrix in the marker coordinate system. A relative orientation matrix $R_{RM}$ in the marker coordinate system is calculated by following Formula (6) where $R_{BASE}$ is the orientation matrix of the image capturing apparatus 102, and $R_{PTZ}$ is the orientation matrix of the image capturing apparatus 101. The system control unit 219 calculates the relative orientation matrix $R_{RM}$ using Formula (6).

$$R_{RM} = R_{PTZ} R_{BASE}^{-1} \quad (6)$$

In Formula (6), $R_{BASE}^{-1}$ is an inverse matrix of $R_{BASE}$. In step S903, the system control unit 219 performs coordinate transformation so as to express the relative position vector $T_{RM}$ and the relative orientation matrix $R_{RM}$ in the marker coordinate system calculated in steps S901 and S902 in a coordinate system defined based on the reference image capturing apparatus (the image capturing apparatus 102). In the following description, the coordinate system defined based on the reference image capturing apparatus is referred to as a reference camera coordinate system. A relative position vector $T_R$ expressed by the reference camera coordinate system is calculated by following Formula (7). The system control unit 219 calculates the relative position vector $T_R$ expressed by the reference camera coordinate system, using Formula (7).

$$T_R = R_{BASE}^{-1} T_{RM} \quad (7)$$

Further, $R_R$ is a relative orientation matrix expressed by the reference camera coordinate system. The system control unit 219 transforms the relative orientation matrix $R_{RM}$ in the marker coordinate system into a rotation vector to calculate the relative orientation matrix $R_R$. A rotation vector is a vector of which a direction and a size respectively represent a rotation axis and a rotation amount. The system control unit 219 can perform transformation of arbitrary rotation matrix R and rotation vector r using a relationship expressed in following Formula (8).

$$\sin(\theta) \begin{bmatrix} 0 & -r_z & r_y \\ r_z & 0 & -r_x \\ -r_y & -r_x & 0 \end{bmatrix} = \frac{R - R^T}{2} \quad (8)$$

In Formula (8), rx, ry, and rz are x, y, and z components of a unit vector indicating a direction of the rotation vector r. θ indicates a rotation amount, i.e., a size of the rotation vector r. A relative orientation vector $R_{Rvec}$ expressed by the reference camera coordinate system is calculated by following Formula (9) where $R_{RMvec}$ is a relative orientation vector in the marker coordinate system calculated using Formula (8). The system control unit 219 calculates the relative orientation vector $R_{Rvec}$ expressed by the reference camera coordinate system using Formula (9).

$$R_{Rvec} = R_{BASE}^{-1} R_{RMvec} \qquad (9)$$

The system control unit 219 returns the calculated relative orientation vector $R_{Rvec}$ to a rotation matrix and thus can calculate the relative orientation matrix $R_R$ expressed by the reference camera coordinate system. In order to transform an arbitrary rotation vector r into a rotation matrix R, Rodrigues' rotation formula shown in following Formula (10) can be used. The system control unit 219 calculates the relative orientation matrix $R_R$ from the relative orientation vector $R_{Rvec}$ using a relationship indicated by Formula (10).

$$R = \begin{bmatrix} \cos\theta + r_x^2(1-\cos\theta) & r_x r_y(1-\cos\theta) - r_z \sin\theta & r_x r_z(1-\cos\theta) + r_y \sin\theta \\ r_y r_x(1-\cos\theta) + r_z \sin\theta & \cos\theta + r_y^2(1-\cos\theta) & r_y r_x(1-\cos\theta) - r_x \sin\theta \\ r_z r_x(1-\cos\theta) - r_y \sin\theta & r_z r_y(1-\cos\theta) + r_x \sin\theta & \cos\theta + r_z^2(1-\cos\theta) \end{bmatrix} \qquad (10)$$

By the above-described processing, the system control unit 219 obtains the position data ($T_{RM}$, $T_R$) and the orientation data ($R_{RM}$, $R_R$) of the image capturing apparatus 101 with respect to the image capturing apparatus 102 (the reference image capturing apparatus) as information representing the positional relationship between the image capturing apparatus 101 and the image capturing apparatus 102. Accordingly, the system control unit 219 specifies the positional relationship between the image capturing apparatus 101 and the image capturing apparatus 102.

FIG. 10 is a flowchart illustrating an example of coordination processing between the image capturing apparatus 101 and the image capturing apparatus 102. The flowchart in FIG. 10 includes three rows. The left side portion of the flowchart represents processing performed by the client apparatus 103. The center portion of the flowchart represents processing performed by the image capturing apparatus 102. The right side portion of the flowchart represents processing performed by the image capturing apparatus 101. Dashed line arrows in FIG. 10 represent communication performed between apparatuses.

In step S1001, the system control unit 219 transmits a request command for requesting transmission of a captured image to the image capturing apparatus 101 and the image capturing apparatus 102.

In step S1002, the system control unit 213 of the image capturing apparatus 102 receives the request command transmitted in step S1001 and starts processing for capturing an image via the image capturing unit 211 and the image processing unit 212 and transmitting the captured image to the client apparatus 103. The system control unit 213 may capture an image only once and transmit the captured image to the client apparatus 103 or may periodically repeat capturing of images and continue transmitting the captured images to the client apparatus 103.

In step S1003, the system control unit 203 of the image capturing apparatus 101 receives the request command transmitted in step S1001 and starts processing for capturing an image via the image capturing unit 201 and the image processing unit 202 and transmitting the captured image to the client apparatus 103. The system control unit 203 may capture an image only once and transmit the captured image to the client apparatus 103 or may periodically repeat capturing of images and continue transmitting the captured images to the client apparatus 103.

In step S1004, the system control unit 219 displays the respective images distributed from the image capturing apparatus 101 and the image capturing apparatus 102 on the display unit 217. Accordingly, a user can view the respective images captured by the image capturing apparatuses in real time.

In step S1005, the system control unit 219 specifies a region in the image of the image capturing apparatus 102 which is designated by the user via the input unit 218 and displayed on the display unit 217 of the client apparatus 103. In the following description, the region specified in this step is referred to as a region of interest (ROI).

A method for designating the ROI includes a method for designating a place to be focused on from a video displayed on the display unit 217 by a pointing device, such as a mouse. In this case, a region in a rectangular form may be designated as the ROI, and only one point on an image may be designated as the ROI. In a case where only one point is designated, the system control unit 219 specifies, for example, a region having a predetermined form centering on the point designated in the image as the ROI. In the present embodiment, only one point in an image is designated as the ROI. A user interface (UI) used for designating the ROI is described below with reference to FIG. 14.

In step S1006, the system control unit 219 extracts coordinates (two-dimensional data) of a center point of the ROI in the image specified in step S1005 via the image processing unit 223 and transmits the extracted coordinate data to the image capturing apparatus 102.

In step S1007, the system control unit 213 receives the coordinate data transmitted from the client apparatus 103 in step S1006.

In step S1008, the system control unit 213 calculates space coordinates of the center point of the ROI from coordinates indicated by the data received in step S1007 via the spatial information processing unit 214. The space coordinates of the center point of the ROI are three-dimensional vectors indicating the coordinates of the ROI in the camera coordinate system of the image capturing apparatus 102. Processing for calculating the space coordinates of the ROI is described in detail below with reference to FIGS. 11A to 11D and 12.

In step S1009, the system control unit 213 transmits data of the space coordinates of the center point of the ROI calculated in step S1008 to the client apparatus 103.

In step S1010, the system control unit 219 receives the data of the space coordinates of the ROI in the camera coordinate system transmitted from the image capturing apparatus 102 in step S1009.

In step S1011, the system control unit 219 transmits the coordinates indicated by the data received in step S1010 to the image capturing apparatus 101. According to the present embodiment, in steps S1009 to S1011, the data of the space coordinates of the center point of the ROI calculated by the image capturing apparatus 102 is transmitted to the image capturing apparatus 101 via the client apparatus 103. However, in step S1009, the system control unit 213 of the image capturing apparatus 102 may transmit the coordinate data calculated in step S1008 directly to the image capturing apparatus 101.

In step S1012, the system control unit 203 receives the coordinate data transmitted from the client apparatus 103 in step S1011.

In step S1013, the system control unit 203 calculates directions for the pan-tilt drive based on the positional relationship indicated by the information received in step S516 via the spatial information processing unit 208 and the space coordinates of the center point of the ROI (the coordinates indicated by the data received in step S1012). According to the present embodiment, the information representing the positional relationship between the image capturing apparatus 101 and the image capturing apparatus 102 received in step S516 is information indicating the position and the orientation of the image capturing apparatus 101 (for example, $T_R$, $T_{RM}$, $R_R$, and $R_{RM}$) with respect to the reference image capturing apparatus (the image capturing apparatus 102). The system control unit 203 determines the directions for the pan-tilt drive so that, for example, the image capturing apparatus 101 can capture an image of a specified region centering on the coordinates indicated by the data received in step S1012. Processing in step S1013 is described in detail below with reference to FIG. 13. The system control unit 203 may perform processing, in step S1013, for calculating a desirable zoom angle based on the space coordinates of the center point of the ROI.

In step S1014, the system control unit 203 determines whether the pan-tilt drive can be performed with respect to the directions calculated in step S1013 by the pan-tilt-zoom control unit 207. The image capturing apparatus 101 has a pan drive range from −175 degrees to +175 degrees and a tilt drive range from 0 degree to +90 degrees, so that determination in step S1014 is false in a case where the calculated pan and tilt directions are out of the ranges and is true in a case where the directions are within the ranges. In a case where the system control unit 203 determines that the pan-tilt drive can be performed to the directions calculated in step S1013 (YES in step S1014), the processing proceeds to step S1015. In a case where the system control unit 203 determines that the pan-tilt drive cannot be performed with respect to the directions calculated in step S1013 (NO in step S1014), the processing in FIG. 10 is ended.

In step S1015, the system control unit 203 issues a pan-tilt drive instruction to the pan drive unit 204 and the tilt drive unit 205 via the pan-tilt-zoom control unit 207. The pan drive unit 204 and the tilt drive unit 205 perform respective driving based on the instruction. The system control unit 203 may instruct the zoom drive unit 206 to change the zoom angle via the pan-tilt-zoom control unit 207.

According to the present embodiment, the processing in step S1008 and the processing in step S1013 are respectively performed by the image capturing apparatus 102 and the image capturing apparatus 101 in response to the instructions from the client apparatus 103. However, the client apparatus 103 may calculate pan and tilt directions of the image capturing apparatus 101 using the spatial information processing unit 222 and the image processing unit 223 based on video distributed from each monitoring camera and instruct only the image capturing apparatus 101 to perform the pan-tilt drive.

Figure 11A:
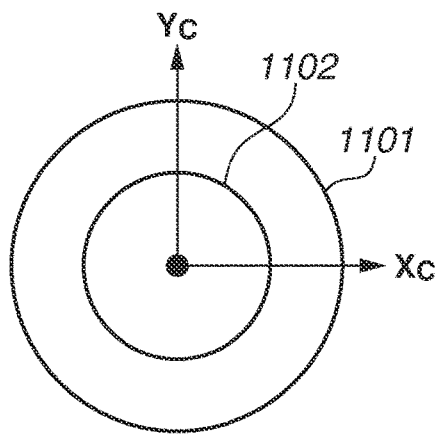
FIGS. 11A to 11D illustrate an example of a mechanism of a wide-angle image capturing apparatus.
Figure 11B:
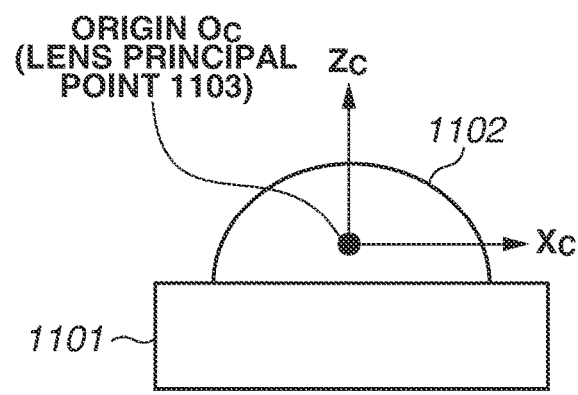
Figure 11C:
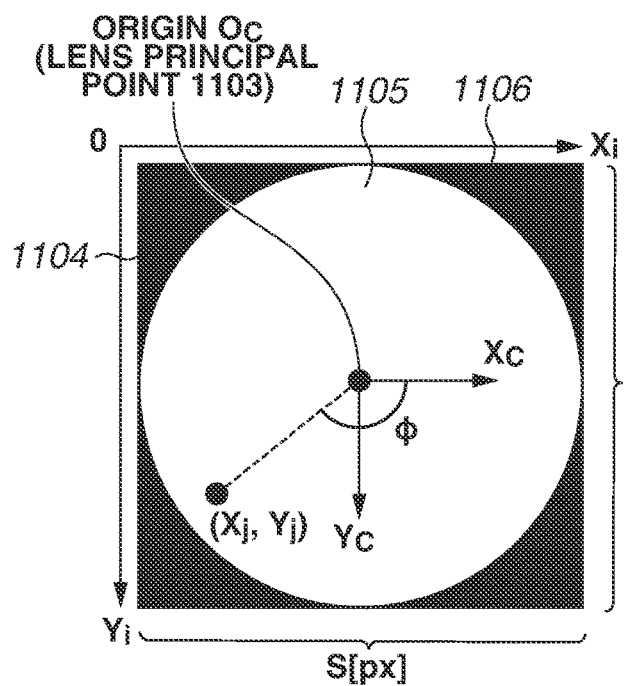

FIGS. 11A to 11D illustrate an example of a mechanism of a wide-angle image capturing apparatus 102. FIG. 12 illustrates an example of calculation processing for calculating a vector from the wide-angle image capturing apparatus 102 to an object. The processing in step S1008 is described in detail with reference to FIGS. 11A to 11D and 12.

First, the configuration of the image capturing apparatus 102 is schematically described with reference to FIGS. 11A to 11D. FIG. 11A is a diagram illustrating the image capturing apparatus 102 horizontally placed on the ground when viewed directly from the above thereof. FIG. 11B is a side view of the image capturing apparatus 102. FIG. 11C is an example of an image captured by the image capturing apparatus 102. The image capturing apparatus 102 includes a base portion 1101 and a dome portion 1102. The dome portion 1102 includes the image capturing unit 211 inside thereof. The image capturing unit 211 includes a very wide angle lens having a viewing angle of 180 degrees. In a case where the image capturing apparatus 102 captures an image, a square image 1104 having S pixels on each side is obtained as illustrated in FIG. 11C. The square image 1104 includes a circular field of view 1105 obtained by projecting a visual field of 180 degrees on the image and a mask region 1106 filled in black on the outside of the circle. For the square image 1104, an image coordinate system is defined which include an upper left of the image as an origin, an $X_i$ axis in a right direction from the origin, and a $Y_i$ axis in a downward direction from the origin.

Next, the camera coordinate system of the image capturing apparatus 102 is described. The camera coordinate system of the image capturing apparatus 102 which is a coordinate system defined based on the image capturing apparatus 102 is defined as a following coordinate system. The origin $O_C$ of the camera coordinate system of the image capturing apparatus 102 is a lens principal point 1103. The coordinate axes of the camera coordinate system of the image capturing apparatus 102 are defined as the $Z_C$ axis, the $X_C$ axis, and the $Y_C$ axis. The $Z_C$ axis is an axis in a directly upward direction of the image capturing apparatus 102 in a case where the image capturing apparatus 102 is horizontally placed on the ground. The $X_C$ axis and the $Y_C$ axis are axes defined to be perpendicular to each other in the horizontal direction in a case where the image capturing apparatus 102 is horizontally placed on the ground. According to FIG. 11C, coordinates on the image corresponding to the origin $O_C$ of the camera coordinate system can be defined on the image 1104, and the right direction and the downward direction thereof are respectively defined as the $X_C$ axis and the $Y_C$ axis. According to the present embodiment, a pixel corresponding to the camera origin $O_C$ is a pixel on central coordinates of the image 1104, i.e., a pixel on coordinates (S/2, S/2).

It is assumed that an arbitrary pixel in the field of view 1105 of the image 1104 is selected, and the pixel has coordinates (Xj, Yj) on the image. The coordinates correspond to a direction of an object captured in the pixel corresponding to the coordinates viewed from the image capturing apparatus 102.

Figure 11D:
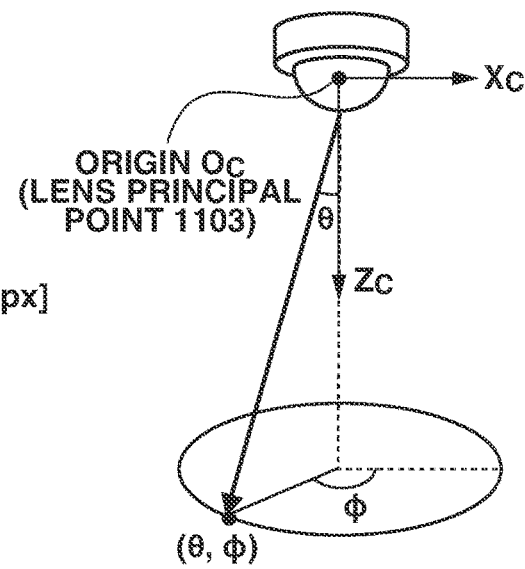
Figure 12:
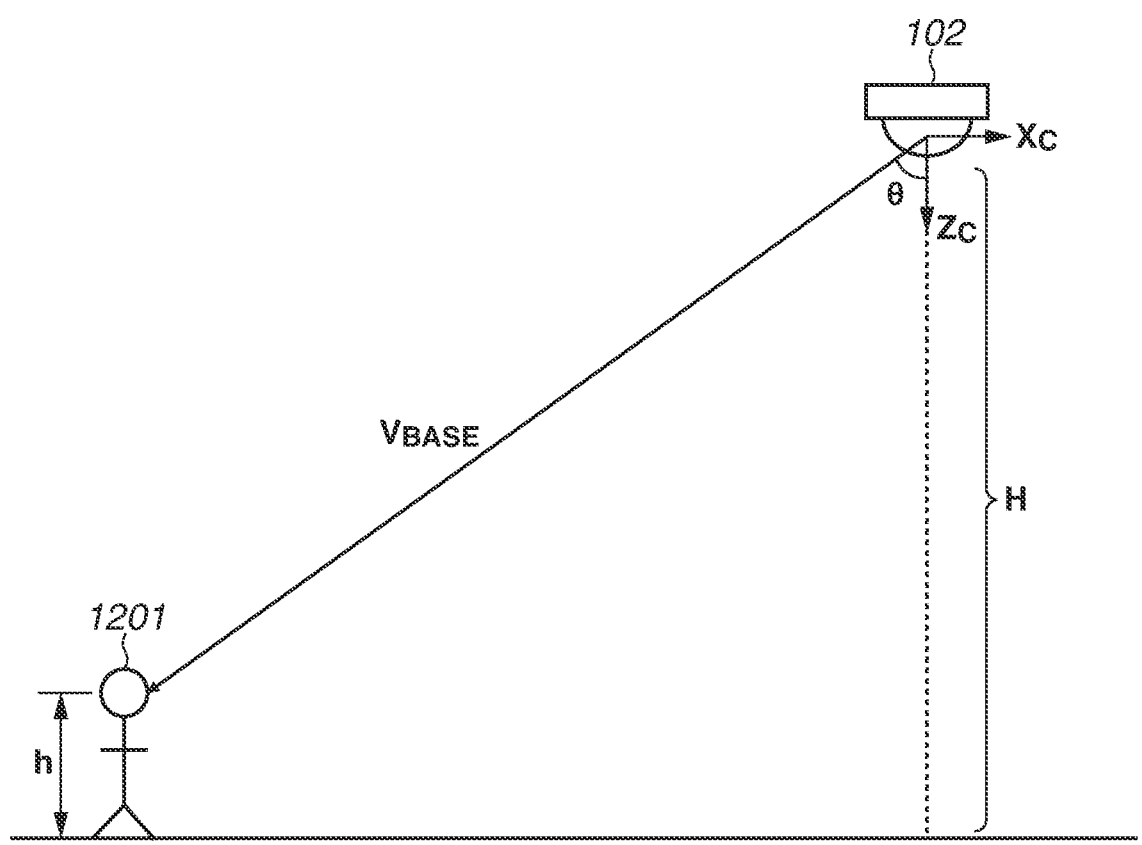
FIG. 12 illustrates an example of calculation processing of a vector from a wide-angle image capturing apparatus to an object.

FIG. 11D illustrates the imaging direction of the image capturing apparatus 102. A direction vector is assumed which extends from the image capturing apparatus 102 to a certain point on an object (an object as an imaging target, an object arranged in the surrounding environment, and the like). According to FIG. 11D, a direction of the direction vector extending from the image capturing apparatus 102 to the object is specified from an angle θ of the direction vector with respect to the $Z_C$ axis and an angle φ formed between the direction vector projected on an ($X_C$, $Y_C$) plane and the $X_C$ axis. Thus, the direction vector can be expressed as (θ, φ). The system control unit 213 of the image capturing apparatus 102 can uniquely calculate the direction (θ, φ) of the object captured in the pixel on the coordinates viewed from the image capturing apparatus 102 based on the coordinates (Xj, Yj) on the image using a lens model in which distortion of a lens is defined. The direction (θ, φ) can be calculated from the coordinates (Xj, Yj) using following Formulae (11) and (12). The system control unit 213 calculates θ and φ respectively using Formula (11) and Formula (12).

$$\theta = \frac{\pi\sqrt{\left(X_j - \frac{S}{2}\right)^2 + \left(Y_j - \frac{S}{2}\right)^2}}{S} \tag{11}$$

$$\varphi = \tan^{-1}\left(\frac{Y_j - \frac{S}{2}}{X_j - \frac{S}{2}}\right) \tag{12}$$

Accordingly, the system control unit 213 can uniquely calculate the direction (θ, φ) viewed from the image capturing apparatus 102 from the coordinates (Xj, Yj) designated on the image 1104.

Next, based on the direction (θ, φ) viewed from the image capturing apparatus 102, a method for calculating spatial coordinates of an object 1201 captured on the coordinates (Xj, Yj) corresponding to the direction will be described with reference to FIG. 12. It is assumed that the image capturing apparatus 102 is horizontally installed on a ceiling. In a case where a vector from the image capturing apparatus 102 to the object 1201 is represented by $V_{BASE}$, calculating the spatial coordinates of the object 1201 is equivalent to calculating the vector $V_{BASE}$. However, a distance to the object 1201 cannot be specified only from the direction (θ, φ) viewed from the image capturing apparatus 102, so that the vector $V_{BASE}$ cannot be uniquely calculated. Thus, in the present embodiment, the following preconditions are set. The floor is horizontal, and the object 1201 is a person's face. If it is assumed that a person's height is constant, a value of a height h from the floor to the object 1201 can be defined (ex.: h≈1.6 [m]).

Further, a height H from the floor to the image capturing apparatus 102 can be regarded as known data. This is because, in a case where the marker 301 is horizontally placed on the floor in the processing in step S504, a height H is equal to an absolute value of a $Z_M$ coordinate indicated by the position data of the image capturing apparatus 101 in the marker coordinate system. The vector $V_{BASE}$ can be calculated by following Formula (13) based on the above-described conditions. The system control unit 213 calculates the vector $V_{BASE}$ using Formula (13).

$$V_{BASE} = \begin{bmatrix} (H-h)\tan\theta\cos\varphi \\ (H-h)\tan\theta\sin\varphi \\ H-h \end{bmatrix} \tag{13}$$

The system control unit 213 sets, in step S1008, the coordinates indicated by the information received in step S1007 as (Xj, Yj). The system control unit 213 specifies the direction of the object with respect to the image capturing apparatus 102 which corresponds to the coordinates indicated by the information received in step S1007 by calculating θ and φ respectively using Formula (11) and Formula (12). The system control unit 213 further calculates the vector $V_{BASE}$ using Formula (13) as vector data indicating a position of the object in the camera coordinate system of the image capturing apparatus 102.

Figure 13:
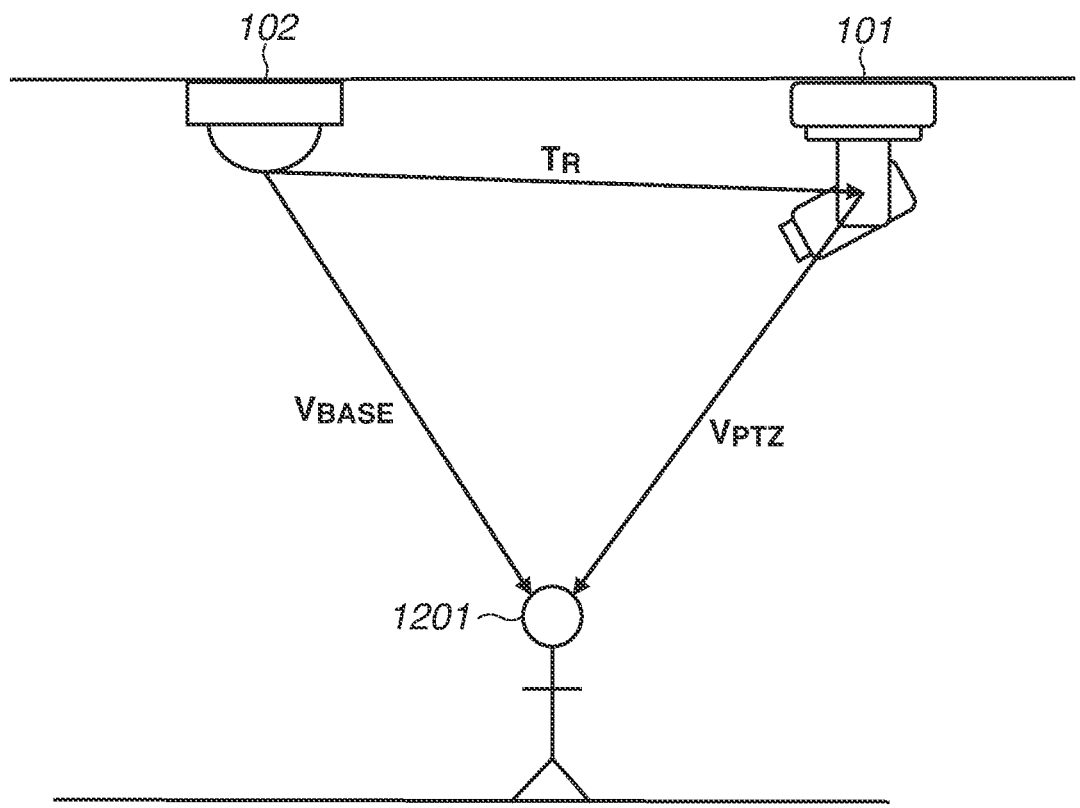
FIG. 13 illustrates an example of calculation processing of a vector from a PTZ image capturing apparatus to an object.

FIG. 13 illustrates an example of calculation processing of a vector from the PTZ image capturing apparatus 101 to an object. The processing in step S1013 is described in detail with reference to FIG. 13.

In FIG. 13, it is assumed that the vector $V_{BASE}$ to the object 1201 when viewed from the image capturing apparatus 102 and the relative position vector $T_R$ from the image capturing apparatus 102 to the image capturing apparatus 101 are calculated before the processing in step S1013 is performed. The system control unit 203 calculates a vector $V'_{PTZ}$ from the image capturing apparatus 101 to the object 1201 in the camera coordinate system of the image capturing apparatus 102 by calculating a difference between the vector $V_{BASE}$ and the vector $T_R$. The system control unit 203 calculates the vector $V'_{PTZ}$ using following Formula (14).

$$V'_{PTZ} = V_{BASE} - T_R \tag{14}$$

Further, the system control unit 203 can calculate a vector $V_{PTZ}$ from the image capturing apparatus 101 to the object 1201 in the camera coordinate system of the image capturing apparatus 101 using following Formula (15) based on the relative orientation matrix $R_R$ from the image capturing apparatus 102 to the image capturing apparatus 101.

$$V_{PTZ} = R_R^{-1} V'_{PTZ} \tag{15}$$

The system control unit 203 calculates the pan angle θ and the tilt angle φ indicating the direction of the object 1201 with respect to the image capturing apparatus 101 using following Formulae (16) and (17) based on the calculated vector $V_{PTZ}$.

$$\theta = \tan^{-1}\frac{V_y}{V_x} - \pi \tag{16}$$

$$\varphi = \frac{\pi}{2} - \tan^{-1}\frac{\sqrt{V_x^2 + V_y^2}}{V_z} \tag{17}$$

In Formulae (16) and (17), $V_X$, $V_Y$, and $V_Z$ respectively represent X, Y, and Z components of the vector $V_{PTZ}$. The system control unit 203 performs the pan-tilt drive in step S1015 so as to change the imaging direction of the image capturing apparatus 101 to the direction indicated by the thus calculated pan angle θ and tilt angle φ. Accordingly, the image capturing apparatus 101 can capture an image of the object 1201.

Figure 14:
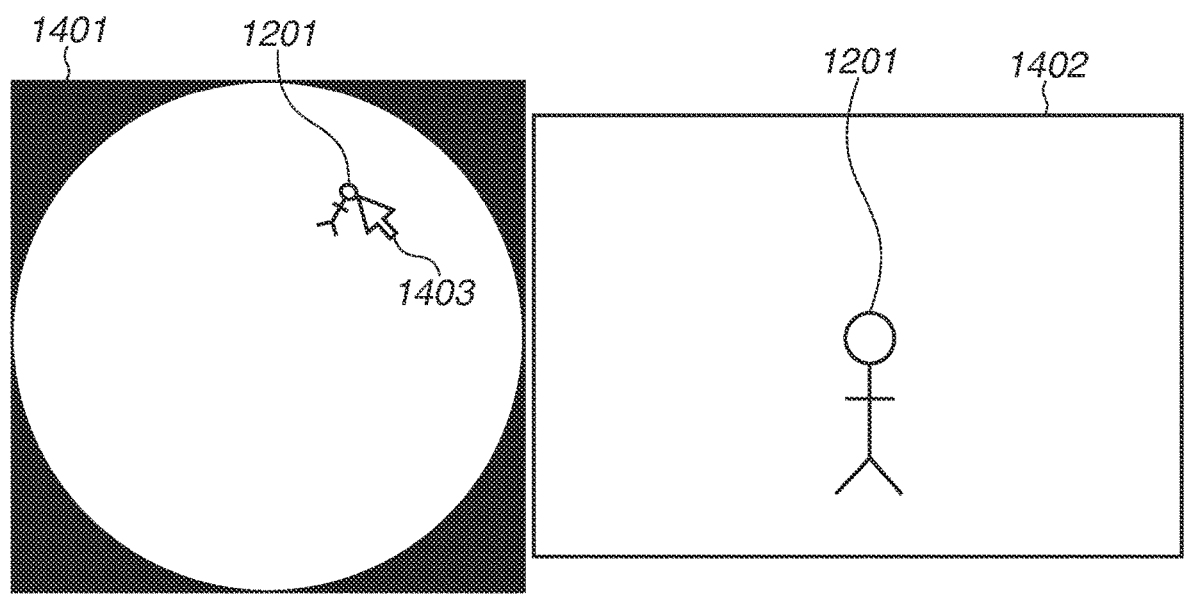
FIG. 14 illustrates an example of a user interface (UI).

FIG. 14 illustrates an example of a UI used in an operation of the monitoring system according to the present embodiment. The UI in FIG. 14 is a GUI displayed on the display unit 217 and operated by a user via the input unit 218. The UI in FIG. 14 includes a wide-angle image region 1401 in which an image transmitted from the image capturing apparatus 102 is displayed, a PTZ image region 1402 in which an image transmitted from the image capturing apparatus 101 is displayed, and a pointer 1403 operated by the pointing device, such as a mouse. A user places the pointer 1403 on a point of interest on an image displayed in the wide-angle image region 1401 by an operation using the input unit 218 and designates the point corresponding to a region of interest (hereinbelow, referred to as a point of interest) by clicking the point using a mouse and the like.

The monitoring system changes the imaging direction of the image capturing apparatus 101 by the processing in FIG. 10 based on determination of the point of interest as a trigger. The image capturing apparatus 101 captures an image by the image capturing unit 201 and the image processing unit 202 under imaging conditions in which the imaging direction is changed and transmits the captured image to the client apparatus 103 via the communication unit 216. The client apparatus 103 receives the image via the communication unit 220, combines the image with the PTZ image region 1402 in the GUI via the image processing unit 223, and displays the GUI on the display unit 217. Accordingly, the user can easily change the imaging direction of the image capturing apparatus 101 and immediately confirm an image captured by the image capturing apparatus 101 of which the imaging direction is changed.

As described above, according to the present embodiment, the monitoring system detects a feature point on the marker 301 from images respectively captured by the image capturing apparatus 101 and the image capturing apparatus 102. Further, the monitoring system calculates the respective positions and orientations of the image capturing apparatus 101 and the image capturing apparatus 102 in the marker coordinate system based on the detected feature point and specifies the positional relationship between the image capturing apparatus 101 and the image capturing apparatus 102 based on the calculated positions and orientations. The monitoring system determines the imaging direction of the image capturing apparatus 101 from a position designated in an image captured by the image capturing apparatus 102 via a UI including the captured image and the specified positional relationship. As described above, the monitoring system can support a setup operation by determining the imaging direction of the image capturing apparatus 101 without a burden of establishing a control look-up table (LUT) for coordinating between image capturing apparatuses unlike the technique described in U.S. Pat. No. 9,313,400. In other words, the monitoring system can support the setup operation with less burden than that of the technique described in U.S. Pat. No. 9,313,400.

Further, it is sufficient that the image capturing apparatus 101 and the image capturing apparatus 102 are arranged so as to capture an image of a feature point (the marker 301) in common with each other, and it is not necessary that their fields of view largely overlap each other. In other words, the monitoring system can support the setup operation in more situations than the technique described in U.S. Pat. No. 9,313,400.

Subsequently, the monitoring system causes the image capturing apparatus 101 to perform the pan-tilt drive so as to change the imaging direction to the determined direction. Accordingly, the monitoring system can adjust the imaging direction of the image capturing apparatus 101 with less burden in more situations.

The present embodiment can support setup operations of a plurality of image capturing apparatuses which are coordinated with each other so as to be executed with less burden in more situations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

For example, an entire or a part of functional configurations of the above-described monitoring system may be mounted on the client apparatus 103, the image capturing apparatus 101, and the image capturing apparatus 102 as hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-107658, filed Jun. 5, 2018, which is hereby incorporated by reference herein in its entirety.

What is claimed is:

1. An information processing apparatus comprising a computer executing instructions that, when executed by the computer, cause the computer to function as:
    a detection unit configured to detect a feature point in an image captured by a first image capturing apparatus and to detect the feature point in an image captured by a second image capturing apparatus, the second image capturing apparatus being capable of changing an imaging direction;
    a spatial information processing unit configured to specify a positional relationship between the first image capturing apparatus and the second image capturing apparatus, by using a position of the first image capturing apparatus identified based on a position of the feature point in the image captured by the first image capturing apparatus and using a position of the second image capturing apparatus identified based on a position of the feature point in the image captured by the second image capturing apparatus, wherein the identified position of the second image capturing apparatus is a position which is unchanged even if the imaging direction of the second image capturing apparatus is changed; and
    a determination unit configured to determine an imaging direction of the second image capturing apparatus based on the positional relationship between the first image capturing apparatus and the second image capturing apparatus specified by the spatial information processing unit and a position designated in the image captured by the first image capturing apparatus.

2. The information processing apparatus according to claim 1, wherein the detection unit is configured to detect a feature point as a point in a marker in which a predetermined pattern is drawn from the image captured by the first image capturing apparatus and the image captured by the second image capturing apparatus.

3. The information processing apparatus according to claim 2, wherein the spatial information processing unit is configured to specify the positional relationship between the first image capturing apparatus and the second image capturing apparatus, by using the position and an orientation of the first image capturing apparatus in a marker coordinate system which is a coordinate system defined based on the marker and using the position and an orientation of the second image capturing apparatus in the marker coordinate system.

4. The information processing apparatus according to claim 1, wherein the instructions further causes the computer to function as a change unit configured to change the imaging direction of the second image capturing apparatus to the imaging direction determined by the determination unit.

5. The information processing apparatus according to claim 1, wherein the instructions further causes the computer to function as:
   a display unit configured to display the image captured by the first image capturing apparatus and the image captured by the second image capturing apparatus; and
   an input unit configured to receive a user selection of a region of interest on the image captured by the first image capturing apparatus and displayed by the display unit as the position designated in the image captured by the first image capturing apparatus.

6. The information processing apparatus according to claim 1, wherein the instructions further causes the computer to function as an obtaining unit configured to obtain a height from a floor to at least one of the first image capturing apparatus and the second image capturing apparatus based on the feature point detected by the detection unit.

7. The information processing apparatus according to claim 1,
   wherein the second image capturing apparatus has a pan drive unit and a tilt drive unit for changing the imaging direction, and
   wherein the identified position of the second image capturing apparatus is a position corresponding to intersection of a pan drive axis of the pan drive unit and a tilt drive axis of the tilt drive unit.

8. The information processing apparatus according to claim 1, wherein the first image capturing apparatus is not capable of changing an imaging direction.

9. A method for processing information executed by an information processing apparatus, the method comprising:
   detecting a feature point in an image captured by a first image capturing apparatus and detecting the feature point in an image captured by a second image capturing apparatus, the second image capturing apparatus being capable of changing an imaging direction;
   specifying a positional relationship between the first image capturing apparatus and the second image capturing apparatus, by using a position of the first image capturing apparatus identified based on a position of the feature point in the image captured by the first image capturing apparatus and using a position of the second image capturing apparatus identified based on a position of the feature point in the image captured by the second image capturing apparatus, wherein the identified position of the second image capturing apparatus is a position which is unchanged even if the imaging direction of the second image capturing apparatus is changed; and
   determining an imaging direction of the second image capturing apparatus based on the specified positional relationship between the first image capturing apparatus and the second image capturing apparatus and a position designated in the image captured by the first image capturing apparatus.

10. A non-transitory computer-readable medium storing a program for causing a computer to execute a method comprising:
   detecting a feature point in an image captured by a first image capturing apparatus and detecting the feature point in an image captured by a second image capturing apparatus, the second image capturing apparatus being capable of changing an imaging direction;
   specifying a positional relationship between the first image capturing apparatus and the second image capturing apparatus, by using a position of the first image capturing apparatus identified based on a position of the feature point in the image captured by the first image capturing apparatus and using a position of the second image capturing apparatus identified based on a position of the feature point in the image captured by the second image capturing apparatus, wherein the identified position of the second image capturing apparatus is a position which is unchanged even if the imaging direction of the second image capturing apparatus is changed; and
   determining an imaging direction of the second image capturing apparatus based on the specified positional relationship of the first image capturing apparatus and the second image capturing apparatus and a position designated in the image captured by the first image capturing apparatus.

* * * * *